APPARATUS FOR DATA SCANNING AND PROGRAMMING

Filed June 24, 1966 14 Sheets-Sheet 1

INVENTORS
THOMAS S. TREBOTICH
HARRY E. LE CLAIRE

BY Gregg & Stidham
ATTORNEYS

APPARATUS FOR DATA SCANNING AND PROGRAMMING

INVENTORS
THOMAS S. TREBOTICH
HARRY E. LE CLAIRE

BY Gregg & Stidham
ATTORNEYS

APPARATUS FOR DATA SCANNING AND PROGRAMMING

Filed June 24, 1966 14 Sheets-Sheet 3

INVENTORS
THOMAS S. TREBOTICH
HARRY E. LE CLAIRE

BY Gregg & Stidham
ATTORNEYS

APPARATUS FOR DATA SCANNING AND PROGRAMMING

Filed June 24, 1966 14 Sheets-Sheet 4

INVENTORS
THOMAS S. TREBOTICH
HARRY E. LE CLAIRE

BY Gregg & Stidham
ATTORNEYS

INVENTORS
THOMAS S. TREBOTICH
HARRY E. LE CLAIRE
BY Gregg & Stidham
ATTORNEYS

Nov. 4, 1969 T. S. TREBOTICH ET AL 3,476,917

APPARATUS FOR DATA SCANNING AND PROGRAMMING

Filed June 24, 1966 14 Sheets-Sheet 6

INVENTORS
THOMAS S. TREBOTICH
HARRY E. LE CLAIRE

BY Gregg & Stidham
ATTORNEYS

Nov. 4, 1969 T. S. TREBOTICH ET AL 3,476,917

APPARATUS FOR DATA SCANNING AND PROGRAMMING

Filed June 24, 1966 14 Sheets-Sheet 7

INVENTORS
THOMAS S. TREBOTICH
HARRY E. LE CLAIRE

BY [signature]
ATTORNEYS

INVENTORS
THOMAS SAMUEL TREBOTICH
HARRY EDWARD LeCLAIRE

BY Gregg & Stidham
ATTORNEY

INVENTORS
THOMAS SAMUEL TREBOTICH
HARRY EDWARD LECLAIRE

BY Gregg & Stidham
ATTORNEY

INVENTORS
THOMAS SAMUEL TREBOTICH
HARRY EDWARD LECLAIRE

BY Gregg & Stidham
ATTORNEY

INVENTORS
THOMAS SAMUEL TREBOTICH
HARRY EDWARD LECLAIRE
BY Gregg & Stidham
ATTORNEY INVENTORS
THOMAS SAMUEL TREBOTICH
HARRY EDWARD LeCLAIRE BY Gregg & Stidham
ATTORNEY

APPARATUS FOR DATA SCANNING AND PROGRAMMING

Filed June 24, 1966 14 Sheets-Sheet 13

INVENTORS
THOMAS SAMUEL TREBOTICH
HARRY EDWARD LECLAIRE

BY Gregg & Stickney
ATTORNEY

APPARATUS FOR DATA SCANNING AND PROGRAMMING

INVENTORS
THOMAS SAMUEL TREBOTICH
HARRY EDWARD LECLAIRE

BY Gregg & Stidham
ATTORNEY

United States Patent Office 3,476,917
Patented Nov. 4, 1969

3,476,917
APPARATUS FOR DATA SCANNING AND PROGRAMMING

Thomas Samuel Trebotich, 41826 Paseo Padre Parkway, Fremont, Calif. 94538, and Harry Edward Le Claire, 7502 DeFoe Drive, San Jose, Calif. 95129

Filed June 24, 1966, Ser. No. 560,214
Int. Cl. G06k 9/00, 7/00
U.S. Cl. 235—61.7 3 Claims

ABSTRACT OF THE DISCLOSURE

Data indicating apparatus including a transparent table adapted to hold a document in predetermined position, a movable plurality of light bars beneath same with individual lights thereof separately energizable to illuminate selected data on the document. A perforated insulating program belt engages a rotatable electrically segmented drum for movement thereover by drum rotation and electrical contacts on a read head riding on the belt of the drum complete circuits for rotating the drum, for moving the light bars and energizing individual lights thereof in sequence programmed by location of belt perforations.

The present invention relates to an improvement in data scanning and identification for recording and the like; and, more particularly, to improved control and programming of data-finding apparatus applicable for utilization with data recording devices.

In the field of data recording, as, for example, by keypunch machines or the like, it is conventional for an operator to employ source documents such as sales invoices, inventories, change orders and the like from which to transfer selected data thereon to more readily usable form for use with computers and other data processing equipment. One manner of recording data of this general type in more usable form lies in the utilization of punch cards which may be produced, for example, by keypunch machines. In the transfer of data to punch cards or the like, it is necessary for a keypunch operator to scan successive sheets of source material and pick out particular portions of the information thereon for punching in particular order as required by some predetermined program. This operation normally requires a substantial skill on the part of the operator and inherently incorporates a high degree of human error. There has been developed a system for simplifying this particular operation and such is disclosed and claimed in U.S. Patent No. 3,208,160 entitled "Aid for Keypunch Operators" and assigned to the same assignee as the present application. Improvements in this field are disclosed and claimed in copending patent applications of Donald R. Biegel and John W. Willis, Ser. No. 222,842, filed Sept. 11, 1962 and now U.S. Patent No. 3,303,331 and Ser. No. 389,417, filed Aug. 13, 1964, both of which are assigned to the assignee of the present invention. In general, these systems provide a light table upon which a source document is placed and having lines of lights thereon selectively energized to underline particular, successive pieces of information in the order in which they are to be applied to punch cards or the like by an operator. This light table is controlled and operated by some type of predetermined program which may be best provided by one or more punched belts which are either manually or automatically revolved to energize particular portions of light lines on the light table to underline successive information in programmed sequence. A plurality of manual and automatic functions are capable of being performed by these prior art devices, and the present invention likewise has the capabilities of accomplishing the same functions.

The present invention is particularly directed to improvement in the systems and devices disclosed and claimed in the above-noted patent and patent applications. More specifically, the present invention provides improvements in the program apparatus and specifically in the program drum and contact portion of the apparatus. In accordance with the present invention a flexible electrically insulating program belt is employed with apertures disposed therethrough in predetermined location and wound and powered about a contact drum for movement therewith. Electrical signals are produced from the belt by movable electrical contacts riding thereon to enter belt apertures and establish electrical contact with segmented drum portions, having differing voltages upon different drum segments. Actual program selection is accomplished by binary coding of the drum contacts connections in order to minimize drum length and, consequently, belt width. This improved programming mechanism of the present invention operates with a light table of a type set forth in the above-noted patent application Ser. No. 222,842 which is, however, herein modified to include an improved servo-drive mechanism for enhanced scanning of the light table.

The present invention provides a material simplification over the above-noted data scanning and indicating apparatus, together with an improved speed of operation which is highly important in the field of data handling.

The data scanning, indicating and control apparatus of the present invention is particularly useful with the well known IBM card punch machine such as that described in Gardinor and Crowell, U.S. Patent No. 2,647,581 entitled "A Record Card Punching Machine," issued on Aug. 4, 1953, or with a verifier machine. It will here be understood that although the apparatus of this invention will be described in use with a keypunch machine, the invention is not limited to such use. For example, as will become apparent in the detailed description hereinbelow, the apparatus of this invention includes a novel program control system which is readily adapted for use in a wide variety of systems and apparatus outside of the field of data scanning and control. It could be employed in a programmed control arrangement for control of a typewriter, teletypewriter, calculator or other key operated machines. However, for purposes of illustration, the apparatus of this invention will be described with reference to use with a well known IBM card punch machine of the type disclosed in the above-mentioned patent.

In the drawings wherein like reference characters refer to the same parts in the several views.

Figure 1:
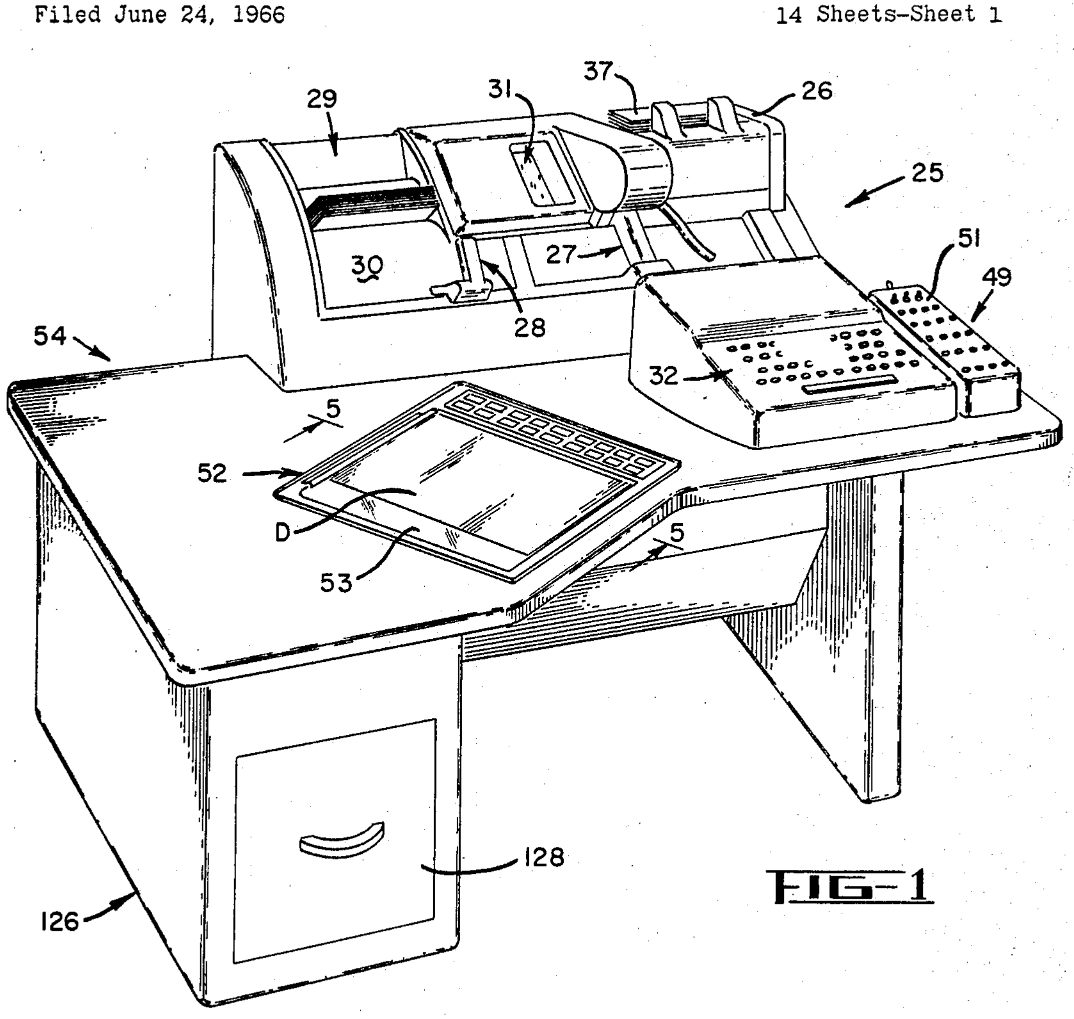
FIGURE 1 is a perspective view of a keypunch machine of the well known type and showing also a portion of the apparatus of the present invention installed in operative relation thereto.

Referring now to FIGURE 1, a card punch machine 25 is there shown which includes a hopper 26, a punching station 27, a reading station 28, a card-receiving station 29 and a receiving hopper 30 for punched cards. A program drum is shown at 31 which is described more particularly hereinbelow. Also shown is a keyboard 32. For further details concerning this keypunch machine one may consult the various IBM manuals, for example, the IBM manual entitled "Reference IBM Operators Guide," No. A24–1010, dated July 1959. One may also consult the aforesaid Gardinor and Crowell Patent No. 2,647,581.

Figure 2:
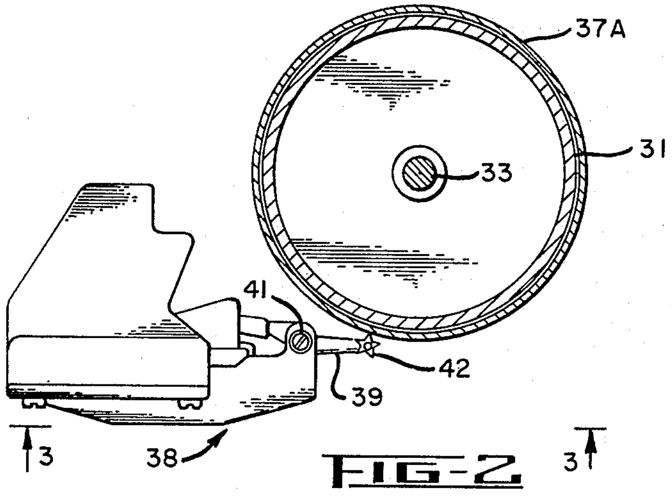
FIGURE 2 is a transverse sectional view through the program drum which forms a part of the machine of FIGURE 1 and showing one of the star wheel assemblies used in conjunction with a program card strapped to the drum.
Figure 3:
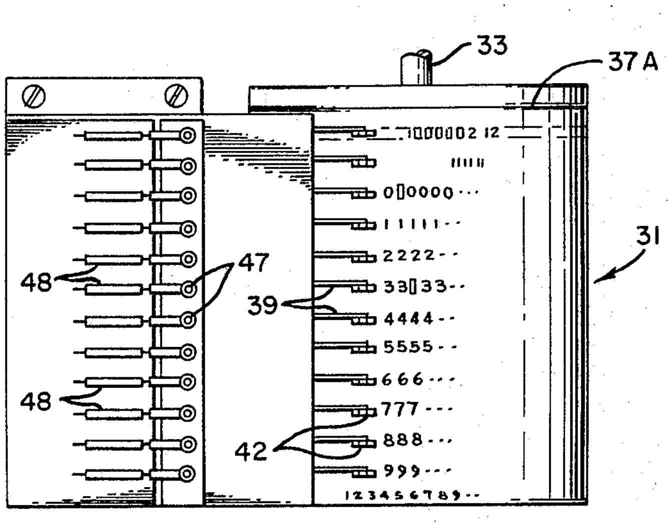
FIGURE 3 is a fragmentary top plan view of the program drum of FIGURE 2 and showing twelve star wheel assemblies which coact with twelve rows of end of field information punched in the card.

The program drum 31, as shown in FIGURES 2 and 3, is fixed to a shaft 33. This shaft and the drum are driven step-by-step in a manner which is well known in this art, under control of a pawl and ratchet mechanism in the keypunch machine. An IBM punch card 37A, shown on the drum in FIGURE 2, is a program card, but its format is like punch cards in general and like the cards 37 shown in the hopper 26, which are waiting to be punched.

Figure 18:
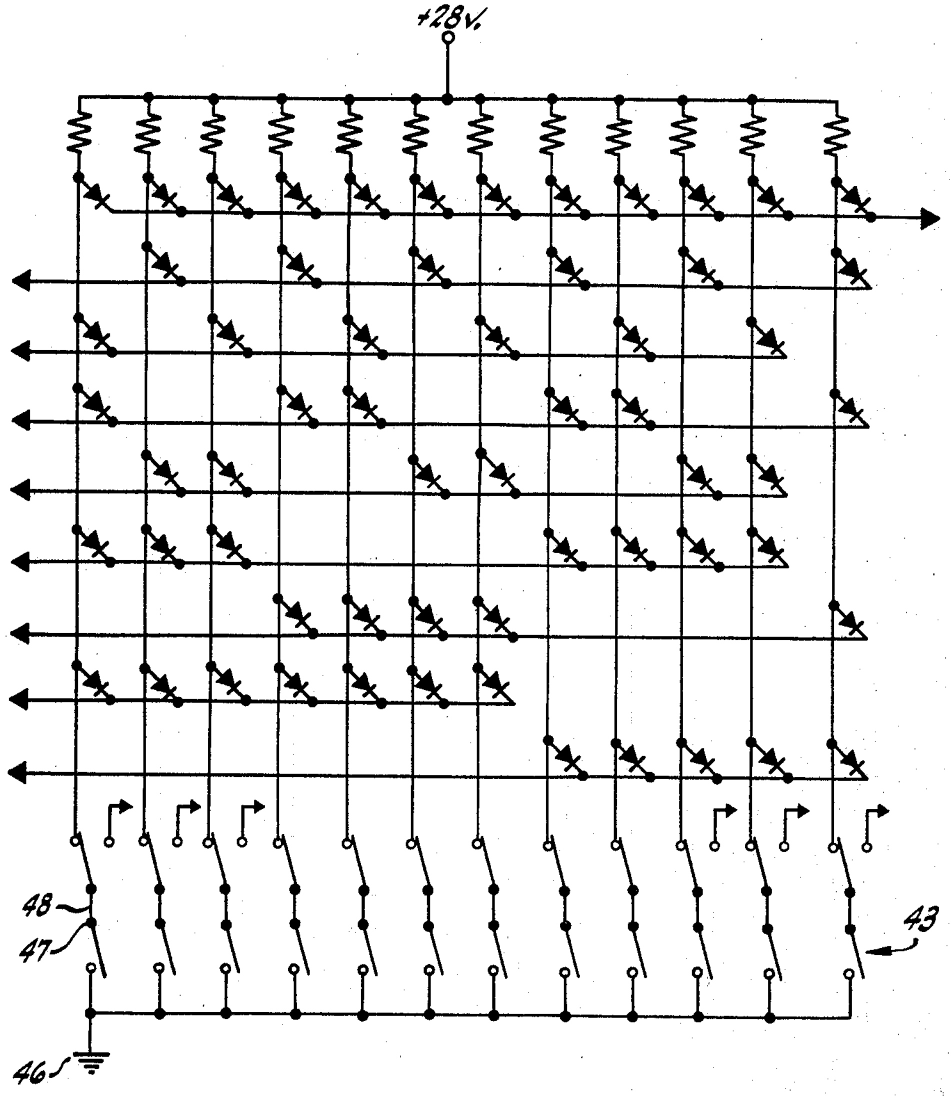
FIGURE 18 is a circuit diagram of a diode matrix or decoder as may be employed in the present invention.

Referring to FIGURES 2 and 3, a well known star wheel sensing mechanism 38 is there shown which operates in conjunction with the program card. A conventional keypunch machine may include a total of twelve such mechanisms, each of which comprises a lever or switch-operating member 39 which is pivotally mounted at 41 and carries a five-pointed star wheel 42 rotatably mounted at the end of the lever 39. The lever 39, control switches 43 (schematically shown in FIGURE 18), the fixed contacts 44 of the switches are connected together and to electrical ground at 46. The moveable contacts of the switches 43 are connected to the terminals 47 (shown in FIGURE 3), which terminals in turn connect through the lead wires 48 to a diode matrix, or decoder, 49 included in the control circuit of the device of the present invention.

Switches 43 remain open as long as the corresponding star wheel is in contact with a program card on the drum 31 at a point where the card is not punched or perforated. When a point of a star wheel registers with a punch or perforation in the program card it drops into the punch or perforation and thereby closes the switch contact operated by such wheel. If two or more slots are punched in successive columns of a horizontal row, for example in the third and fourth columns of No. 12 row, the corresponding star wheel will continue to engage a perforation and its switch contacts will remain closed. But if one or more columns are not punched, the corresponding star wheel will move out of the preceding perforation and its switch contacts will be opened and will remain open until the next perforation is encountered.

Ordinarily, when the card punch machine is used without the data scanning and indicating apparatus of the present invention, the closing and opening of the contacts controlled by the star wheels 42 energizes and deenergizes circuits of the machine to control numerous functions of the machine, such as alpha shift, left zero print control, print zero suppress, automatic duplication, automatic skip, field definition and the like, which functions are well known. However, when the data scanning and indicating apparatus is used in conjunction with the card punch machine, the star wheel controlled contacts are used only for end of field control, that is, to indicate the end of a field and the commencement of a new field. The other card punch machine functions which are normally controlled by the card 37A on the program drum are controlled by a punched belt and associated circuitry included in the novel data scanning and indicating apparatus of this invention. Since there is a total of 12 horizontal rows on the normal program card (numbered from top to bottom, as 12, 11, 0, 1, 2, 3, 4, 5, 6, 7, 8 and 9) it will be readily apparent that twelve different field patterns are available with any given program card on the drum.

Considerable skill intelligence and experience are required by a keypunch operator to readily spot items of data on a course document in the proper order, and to know in each instance how many columns or digits are in the respective field, so that the necessary zeros may be punched in to the left of the first significant digit. For example, invoice numbers in field No. 1 may run from 1 to 999,999 in which case a field of at least six digits would be required. One document in a group may have invoice No. 219 and will require the punching of three zeros in the first three columns of the field; the next document may have invoice No. 49,682 and will require one zero, etc. Also, data may be, and frequently is, distributed randomly with respect to the sequence of field, hence will require the operator to shift her attention in a sequence which is contrary to the normal reading sequence.

It will be apparent from the foregoing that the possibilities of human error in keypunching are great; and that considerable training time is required to learn any particular program to be punched. Where the trained operator shifts from one type of document to another (for example, from sales invoices to bills of lading) or where two or more different programs are required from a single source document, the operator must learn each such program, and this further compounds the difficulties of operator training and precision.

The data scanning and indicating apparatus of the present invention serves to guide the operator by means of lights to direct her attention to successive fields in the proper order, and also to indicate the number of columns or digits in each field. Actuation of the apparatus of this invention is under control of the following: the above-mentioned star wheel control switches which are included in the key punch machine; certain control switches included on a control panel 51 of the auxiliary control box 49 which may be conveniently located adjacent the keyboard 32; and one or two punched program belts included in the present apparatus. Numerous different key punching procedures or routines may be programmed on the belt. The apparatus may be made to automatically repeat or advance to a subsequent routine. Also as mentioned above, card punch machine functions (other than end of field function) which are normally controlled by the drum program card 37A on the card punch machine are under control of the apparatus of the present invention, and may be programmed on the above-mentioned punched program belts. Other useful functions of the apparatus will be apparent from the following descriptions; however, no attempt is made herein to fully describe each possible operation that may be performed by the present invention.

Referring now to FIGURE 1, a document D is there shown in position on light table apparatus 52 for reading by the operator of the key punch machine 25. The apparatus 52 has a translucent panel 53 which may, for example, be of glass or of translucent plastic construction, which holds the document D in proper position and which permits light to shine through the document.

The apparatus 52 is similar in construction to that shown in the above-mentioned co-pending patent applications Ser. No. 222,842 and Ser. No. 389,417. In operation, the light table apparatus 52 serves to underline by a line of light the particular information on a document D that is to be key punched by the operator. In actuality, the apparatus provides for underlining with light the location of the information in proper sequence and, of course, in the absence of any information in the location underlined, the operators would then key punch 0s. It will be appreciated that for different purposes it is desirable to key punch information in different order on punch cards, and the present invention operates to program the sequence of underlining information locations on the document in the order in which they are to be applied to the punch card.

The light table apparatus 52 is carried by a table 54 (see FIGURE 1) which is cut away appropriately to receive the apparatus. The mechanical parts of the apparatus 52 are shown in FIGURES 4 to 7, and referring thereto it will be seen that a movable carriage 55 is provided, including a base plate 56 to which three light bars **57*a*, 57*b* and 57*c* are attached. These light bars are intended to scan the top third (as viewed in FIGURE 1) of document D, the middle third, and the bottom third, respectively, thereof. A pan 58 is affixed to the under surface of the table 54 and a rim 59 is affixed to the upper surface thereof surrounding an opening 61 formed in the table 54. The translucent panel 53 is supported on an inner lip of the rim 59**.

Figure 5:
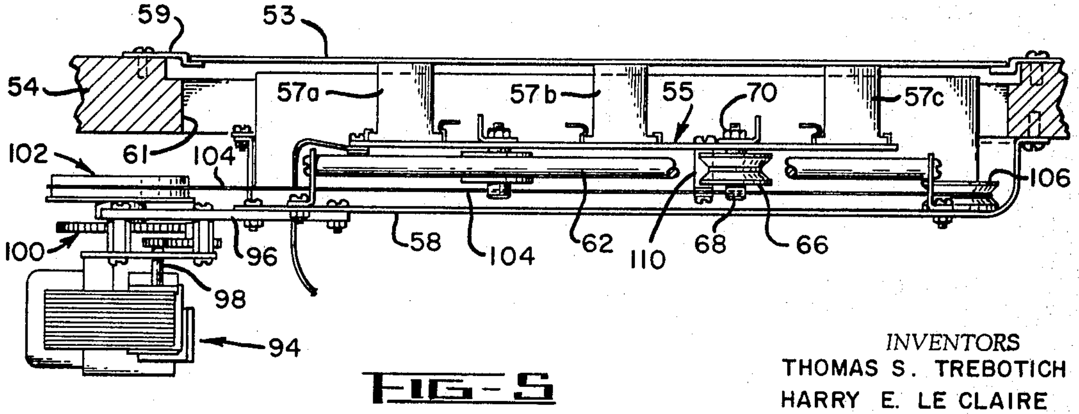
FIGURE 5 is a cross sectional view through the light carriage assembly taken along line 5—5 of FIGURE 1.

Two parallel rods 62, serving as tracks for the carriage 55, are mounted by brackets 64 affixed to the pan at opposite sides thereof. A plurality of grooved rollers are mounted beneath the carriage to bear against both rods 62, so as to suport the carriage thereon. These rollers may be mounted by vertical pins or shafts 68 extending beneath the carriage base 56, as shown in FIGURE 5. Nuts 70 on the upper threaded end of the pins secure the pins to the plate 56.

Figures 6, 7:
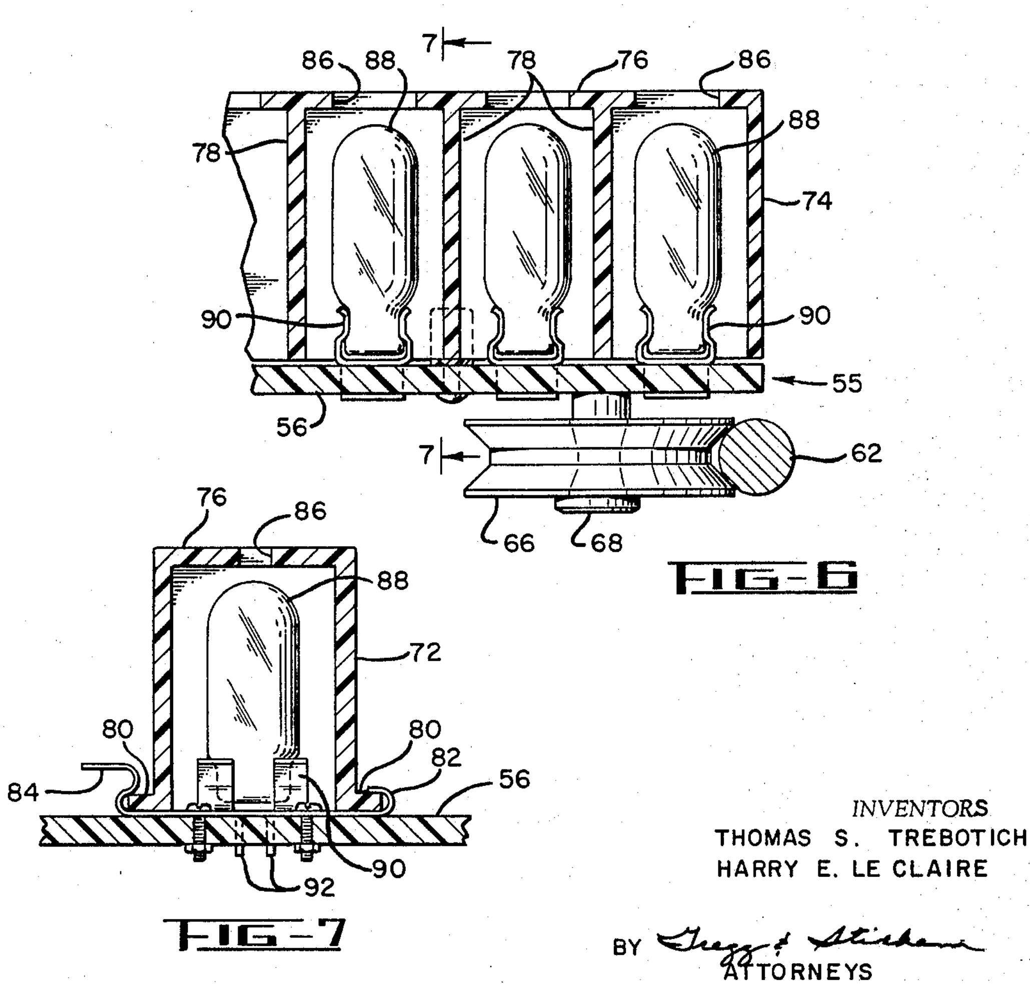
FIGURE 6 is a fragmentary vertical sectional view taken along the line 6—6 of FIGURE 4 showing on an enlarged scale a part of one of the light bars employed to illuminate a source document sequentially.
FIGURE 7 is a sectional view taken along the line 7—7 of FIGURE 6.

The light bars **57*a*, 57*b* and 57*c* are formed identically, hence a detailed description of one of them (57*b*) is included herein. In FIGURES 6 and 7 the light bar 57*b* is illustrated as comprising a cover which includes side walls 72, end walls 74 (only one of which is seen), a top wall 76, and dividing walls 78 extending between the sidewalls and dividing each light bar into a plurality of separate compartments. Flanges 80 are provided along the bottom edge of the side walls 72 for securing the light bar to the base 56. Resilient clips 82 and 84, secured to the base plate 56 by screws, engage the flanges 80 on the opposite side walls to secure the light bar to the base plate 56. The resilient clips 84 are provided with an S-shaped end portion which, when depressed, release the light bar for removal of the cover. Each compartment defined by the aforementioned walls is provided with an elongated slit 86, and a lamp 88 is contained in each compartment. Consecutive clips 90 are mounted on the base plate 56 in each compartment to mount each lamp 88, and each clip is electrically connected to a terminal 92** to which wires are connected for energization of the lamps. In the illustrated arrangement, the lamp covers are illustrated as being formed of opaque plastic, and may be formed by any suitable method, such as molding. Obviously, other suitable opaque materials, such as metal, may be employed to form the light bar covers.

Referring again to FIGURES 4 and 5, the motive means for the carriage 55 includes a motor 94 carried by a bracket 96 attached to the pan 58 and extending rearwardly thereof. A shaft 98 of the motor is connected through a gear train 100 to a pulley 102, and a cable 104 passes about the pulley 102 and an idler pulley 106 rotatably mounted on a shaft 108 attached to the pan 58 adjacent the forward edge thereof. The cable 104 is attached to the carriage 55 by a post 110 depending from the base plate 56 and secured thereto as by a screw or the like.

Figure 4:
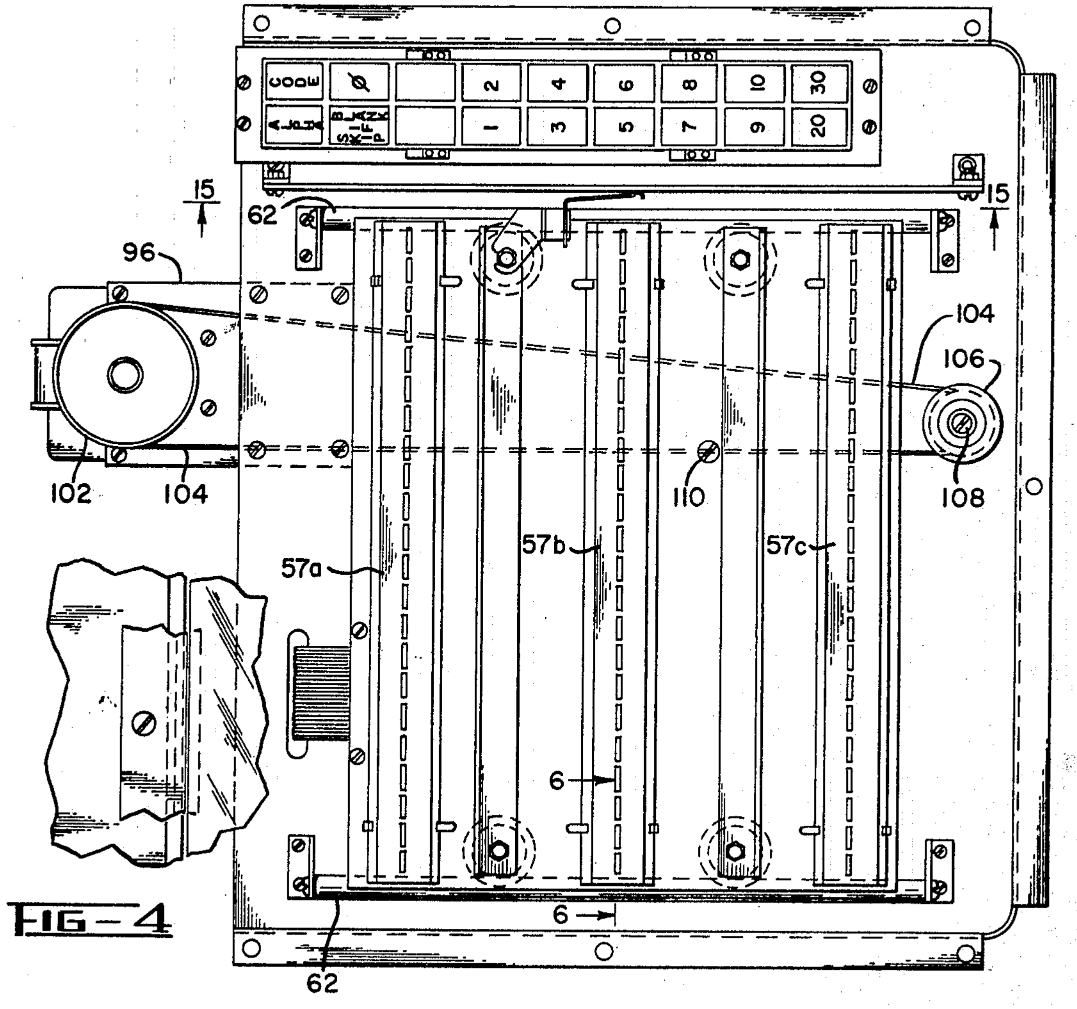
FIGURE 4 is a top plan view of the light carriage assembly with the reading panel removed.

The carriage 56 is shown in FIGURE 4 at its highest or uppermost position. During movement from such position to its lowermost position, the upper light bar **57*a* will scan the upper third of document D, the middle light bar 57*b* will scan the middle third thereof, and the bottom light bar 57*c*** will scan the bottom third of the document. The thirds refer to thirds of a document of a specific length, but for purposes of explanation it will be assumed the thirds relate to any document. This arrangement of light bars limits the degree of travel required by a complete scanning operation, and the lamps of the light bars are selectively energized in a manner described hereinbelow so that, when data to be indicated lies in the portion of a document scanned by any one of the light bars, only that light bar will be activated.

Figure 15:
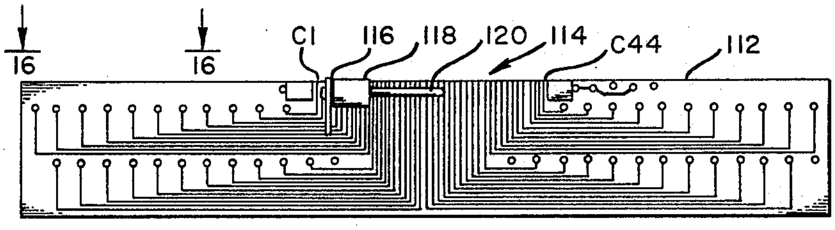
FIGURE 15 shows the commutator board in the light carriage assembly as viewed along line 15—15 of FIGURE 4.
Figure 16:
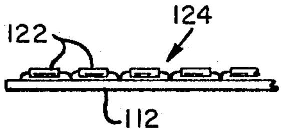
FIGURE 16 is a fragmentary edge view of the board as seen from line 16—16 of FIGURE 15.
Figure 19:
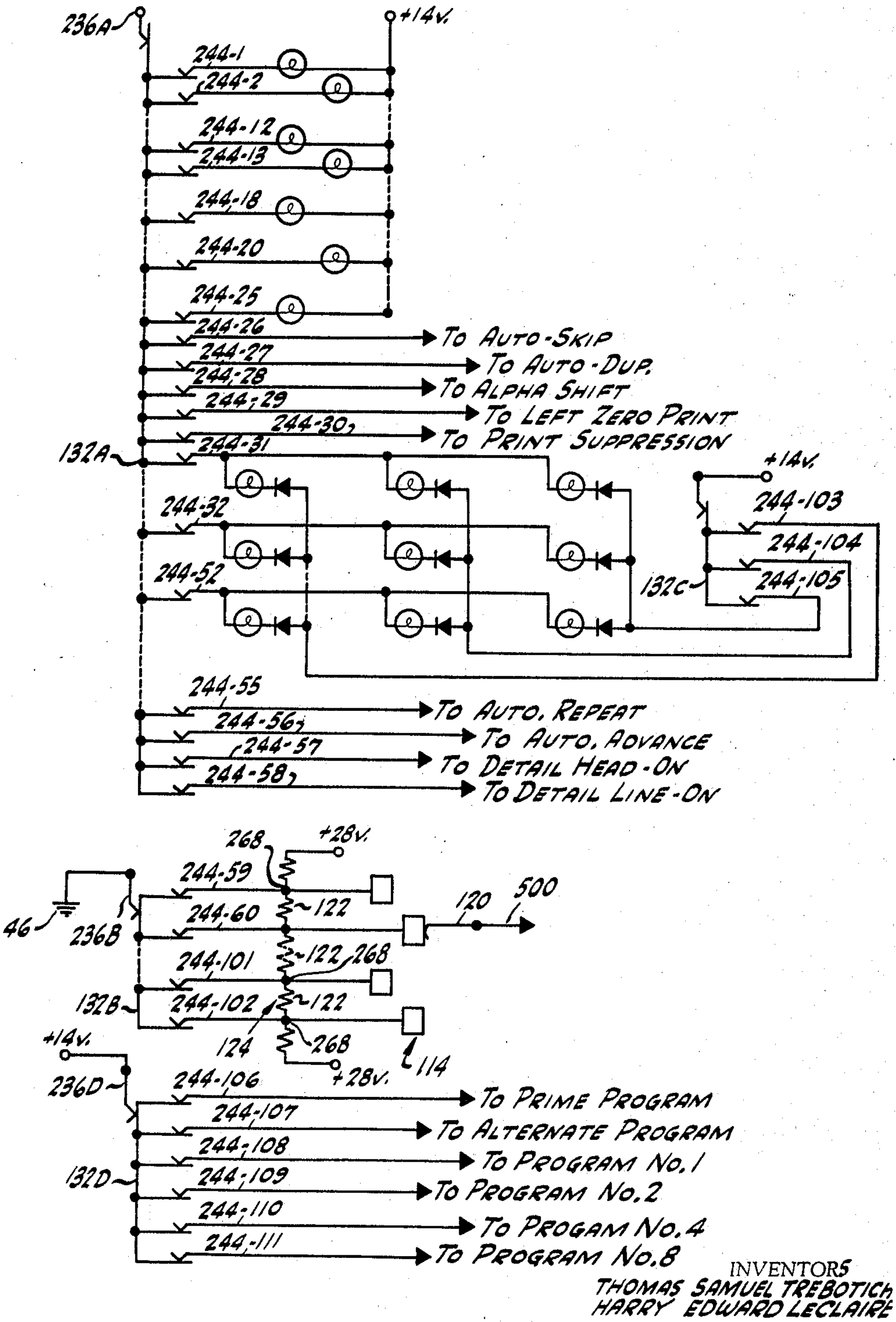
FIGURE 19 is a line diagram of electrical connections of portions of the present invention.

Control means for the carriage drive motor 94 is illustrated in FIGURES 4, 15 and 16. These means include a circuit board 112 of suitable insulating material which is vertically supported adjacent the carriage 55, to the right thereof as viewed in FIGURE 4. A commutator 114 comprising spaced contacts is formed on the board by any suitable means, such as by printed circuit techniques. The embodiment illustrated includes forty-four individual commutator contacts indicated as C–1, C–2, etc. on to C–44. These forty-four contacts correspond to forty-four horizontal lines in each third of the document D. Such lines will be described in greater detail hereinbelow. An angle bracket 116 is mounted on the base plate 56 of the carriage 55 by means of one of the pins 68 and nut 70, the upright portion of which bracket 116 carries a block 118 of insulating material attached thereto by any suitable means, not shown. A slide, or brush, 120 is attached to the insulating block 118 and slidably engages the commutator 114. The dimensions of the brush 120 and contacts C–1, C–2, etc. are such that the brush 120 is in engagement with at least one contact at any position along the commutator. More particularly, the brush 120 is of sufficient width to span the gap between adjacent contacts when the brush is positioned therebetween, but engages a single contact when positioned directly thereon. The contacts C–1, C–2, etc. are connected through the printed circuit wiring to series connected resistors 122 (shown in FIGURE 16) comprising a voltage divided network, designated 124. A schematic circuit diagram of the motor control circuit which includes the voltage divider 124 is shown in FIGURE 19 described in detail hereinbelow.

As explained hereinafter, to scan a document in a predetermined sequence, then repeat the sequence or advance to another sequence, and to automatically control the automatic skip, automatic duplicate, alpha shift and other functions of the key punch machine, the circuit is programmed by means of punched belts and associated sensing heads. Since a total of twelve end of field programs are available through the twelve star wheel zones on the program card 37A, at least 12 different programs may be included on the punched belt. If, however, the field location of two or more programs coincide, the end of field program may be used with different belt programming. Thus, it will be understood any number of programs may be stored on the belts for use with the 12 end of field programs on the program card 37A. (As described hereinbelow, the apparatus is also adapted for use in punching variable field length cards by providing for manual control of the end of field function rather than depending upon the program card 37A for this function.)

The main circuit components for the apparatus of this invention are mounted on a chassis within a cabinet 126 at the key punch machine as generally indicated in FIGURE 1. The abovementioned punched program belts and associated sensing heads are included in a drawer 128 in the cabinet, which drawer may be pulled open for ready access of the program belts for changing the same when desired. The auxiliary control box 49 is located adjacent the keyboard of the key punch machine for easy access by the operator. The light panel apparatus 52, control box 49, main circuit chassis, punched belt programming apparatus and the key punch machine are all interconnected through cables, not shown in FIGURE 1.

The mechanical construction of the punched belt programming apparatus is shown in FIGURES 8 through 14 to which reference is now made. In the illustrated embodiment of the invention, the programming apparatus includes main and secondary programming units designated 130 and 130', which units include main and secondary drive rolls or drums 132 and 132', respectively, and associated main and secondary reading, or sensing heads, 134 and 134'. Main and secondary punched program belts 136 and 136' are adapted to be driven by the drive rolls 132 and 132', and the information in the form of punched holes in the belts is sensed by the reading heads. It will here be understood that the main and secondary drive rolls and reading heads of the program assembly are of substantially identical construction. For this reason, only one of the program units is described in detail hereinbelow, and where corresponding elements in the two units are shown in the drawings or mentioned herein the elements are generally identified by the same reference numeral. However, where it is desired to distinguish between elements in the main and secondary units, the reference characters which identify elements in the secondary unit are primed whereas those elements in the main unit are not. It will be further understood that the invention may be used with only the main reading unit 130 without the secondary unit 130', and that the secondary unit may be eliminated from the construction. The function of the units will become apparent following a detailed description of the apparatus.

Figure 11:
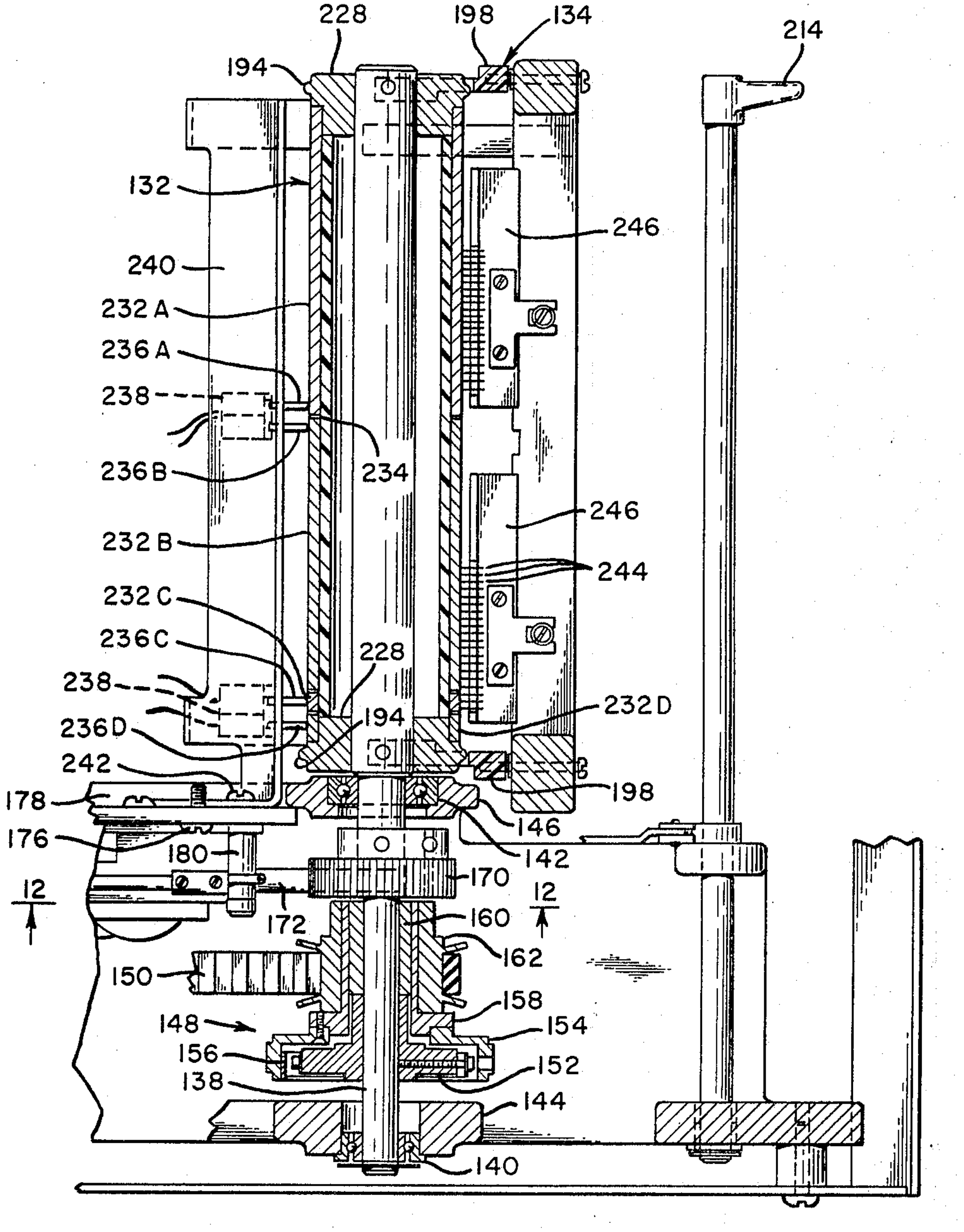
FIGURE 11 is a vertical sectional view through one of the drive drums taken along line 11—11 of FIGURE 9.

The drive rolls 132 and 132' (only one of which is seen in FIGURE 11) are fixedly secured to shafts 138, which shafts are rotatably supported in bearings 140 and 142 carried in a base plate 144 of the assembly and in a bridge member 146 carried on the base plate a spaced distance thereabove. A friction drive mechanism, or clutch, 148 is mounted on the shaft 138 to controllably rotate the shaft 138 by a drive belt 150. Friction drive mechanisms are well known and, thus, only a general description of same is included herein. In FIGURE 11 the mechanism is shown comprising a hub 152 fixedly secured to the shaft 138 by means not shown. A rotatable clutch cylinder 154 surrounds the hub 152 and is in frictional engagement therewith through a clutch shoe 156. The cylinder 154 is attached to a sleeve 158 which, in turn, is rotatably mounted on a sleeve bearing 160 carried by the shaft 138. A pulley 162 is attached to the sleeve 158 by a set screw, over which pulley the drive belt 150 passes.

Figure 8:
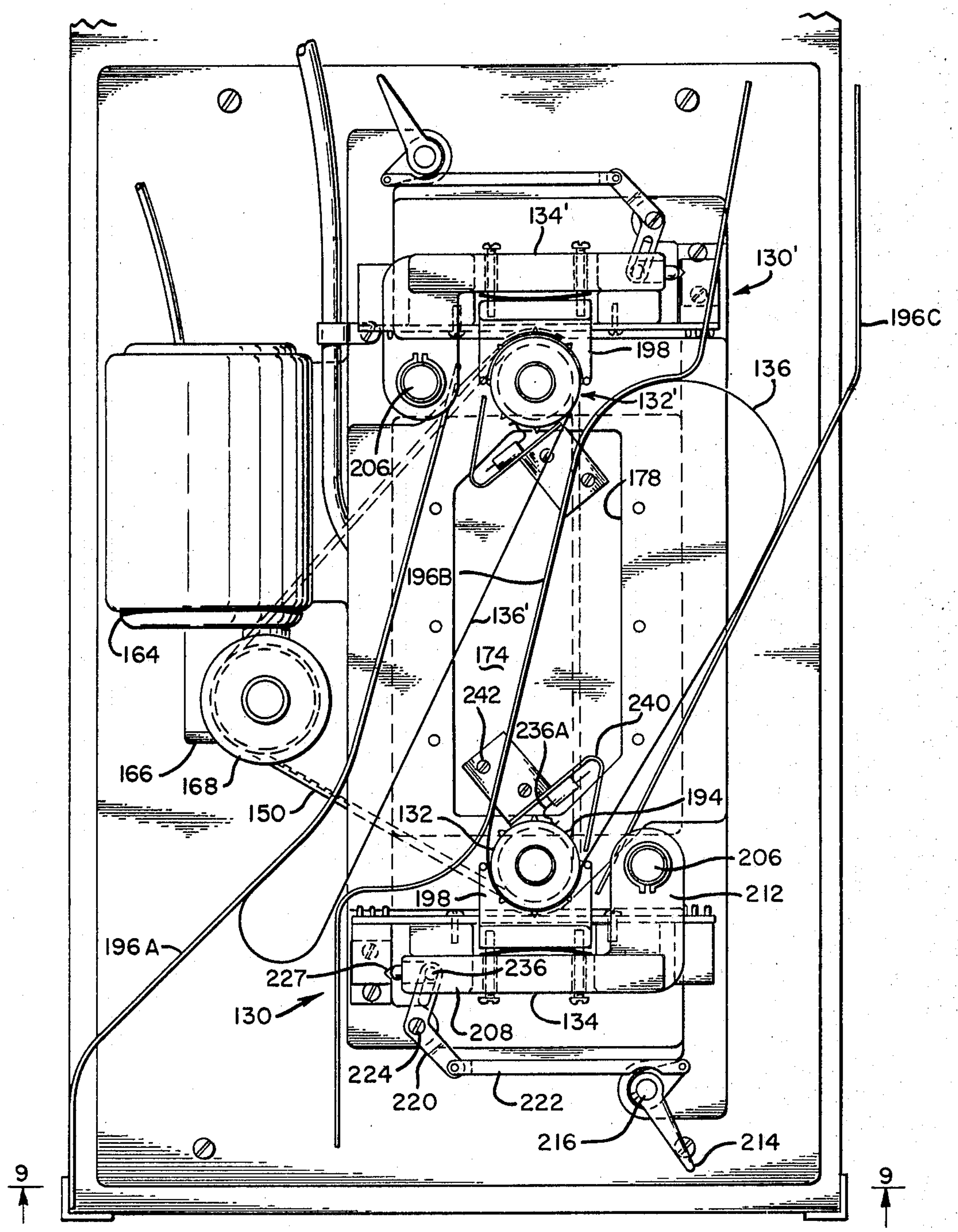
FIGURE 8 is a top plan view of a programming apparatus which includes a main and secondary drive drum for drive actuation of punched program belts which coact with main and secondary reading or sensing heads for control of the apparatus of the present invention and the card punch machine.
Figure 9:
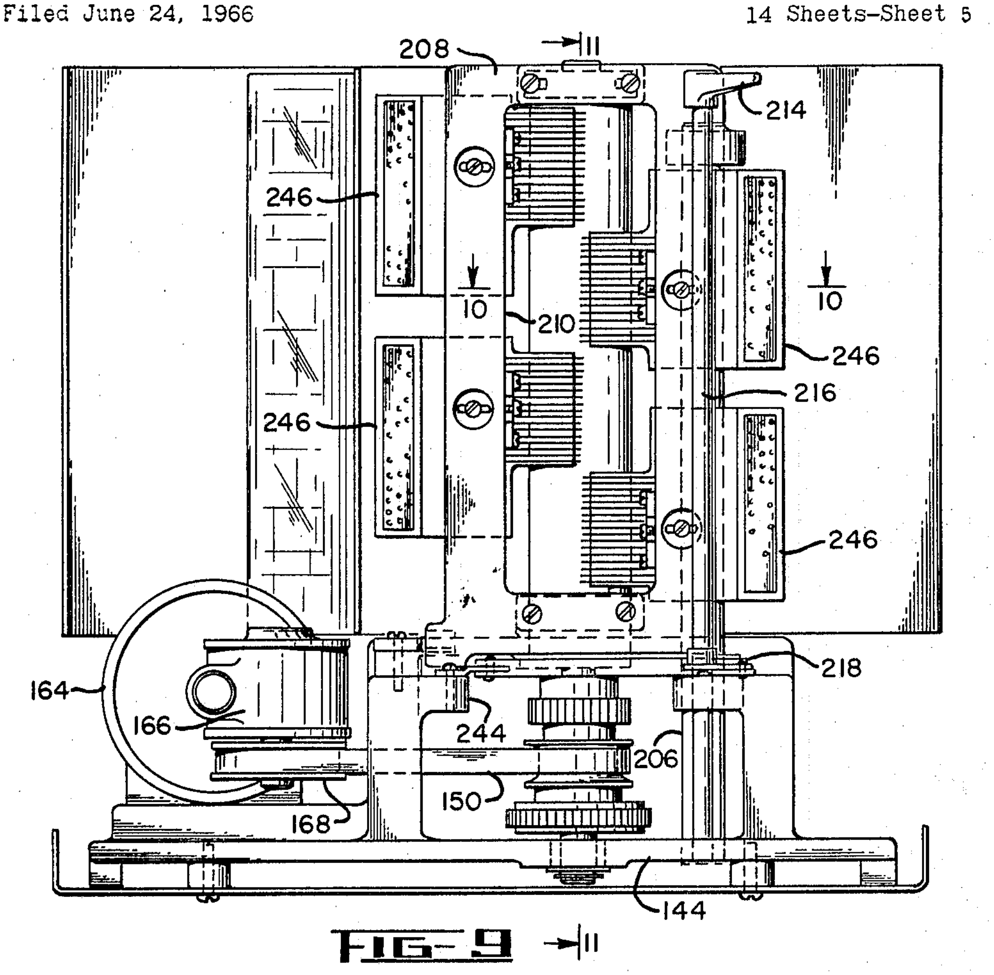
FIGURE 9 is a vertical sectional view taken on line 9—9 of FIGURE 8.
Figures 12, 12A:
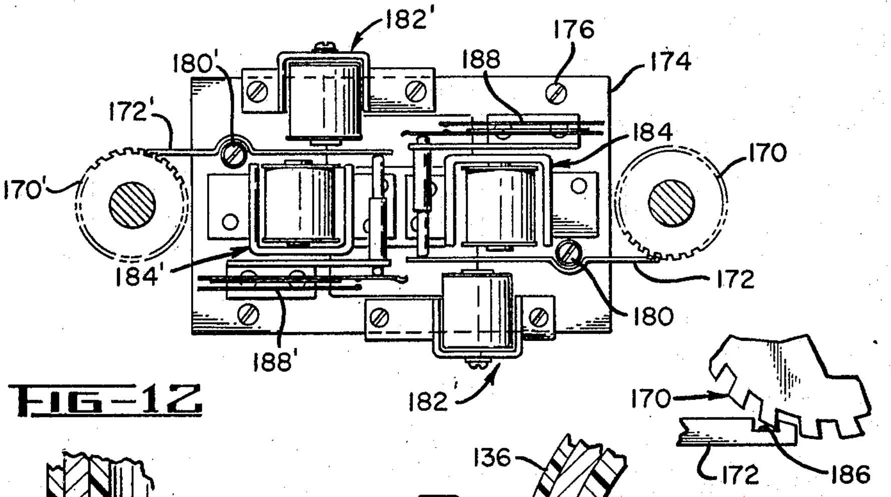
FIGURE 12 is a fragmentary view, on a reduced scale, taken along line 12—12 of FIGURE 11 and showing the pawl actuating solenoids.
FIGURE 12A is an enlarged fragmentary view showing a pawl and ratchet mechanism.

Both of the drive drums or rolls 132 and 132' are driven by a single reversible motor 164 shown in FIGURES 8 and 9. The motor shaft drives a gear box 166, the output shaft of which gear box is provided with a pulley 168. The drive belt 150 extends over both of the driven friction clutch pulleys 162 and the driven pulley 168. It will here be noted that although the motor 164 is continuously energized for rotation in either the forward or reverse direction, the drive rolls 132 and 132' normally are locked against rotation by releasable latching or escapement mechanisms which include ratchet wheels 170 and 170' and pawls 172 and 172' shown in FIGURES 11, 12 and 12A. The latching mechanisms are independently controlled for individual control of the drive rotation of the rolls 132 and 132'. The pawls 172 and 172' and pawl actuating solenoids are mounted on a plate 174 which is secured by screws 176 to the bottom of the bridge 146 at an aperture 178 formed in the bridge. Posts 180 and 180' are attached by screws to the plate and extend downwardly therefrom, upon which posts the pawls 172 and 172', respectively, are pivotally mounted intermediate the ends of the pawls. Pawl latching solenoids 182 and 182' and pawl release solenoids 184 ond 184' are mounted on the plate 174 at opposite sides of the rearward extensions of the pawls 172 and 172' for actuation thereof between latched and unlatched positions. Solenoids 182 and 182', when energized, pivot the pawls 172 and 172', respectively, into engagement with the ratchet wheels 170 and 170' to positively prevent rotation thereof. The pawls (as best seen in FIGURE 12A wherein a fragmentary portion of one pawl 172 is shown) are notched at 186 to engage a ratchet tooth in the latched condition for preventing both forward and reverse rotation of the drums. Energization of the pawl release solenoids 184 and 184' pivots the pawls to release the same from the ratchet wheels, thereby permitting drive actuation of the drums in either rotary direction. The energization circuits for the solenoids are described in detail hereinbelow. It here will be noted that normally open switches 188 and 188' are also mounted on the plate 174, which switches are controlled by the pawls 172 and 172' through actuating rods 190 and 190'. The switches are closed whenever the pawls are disengaged from their associated ratchets. The switches are included in circuits for stepping of the program belts 136 and 136' one column at a time, in a manner described hereinbelow. It is also possible to employ a single solenoid for each ratchet wheel with the solenoid shaft releasably engaging the wheel, to thus simplify this portion of the apparatus.

Figure 17:
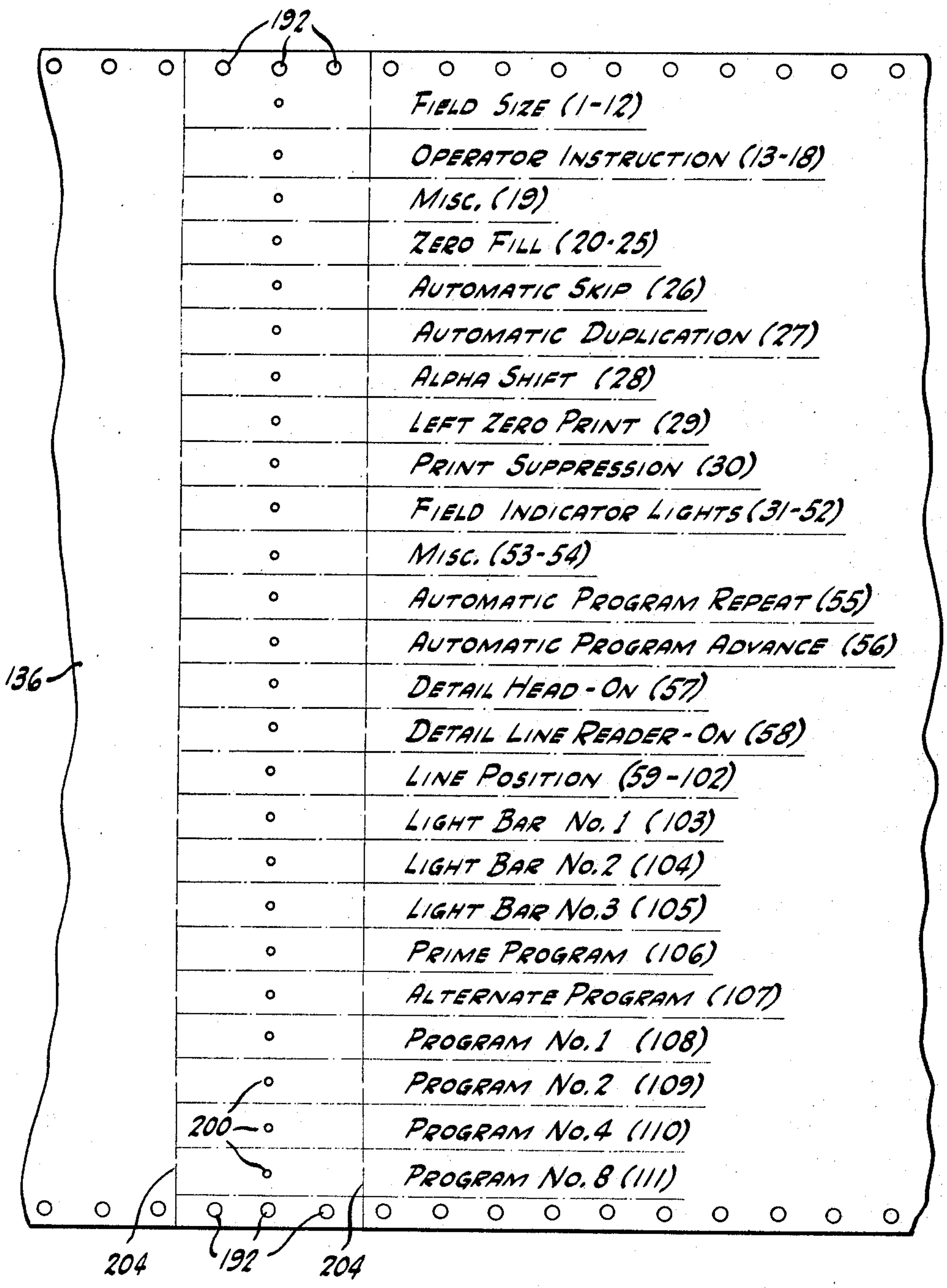
FIGURE 17 is a plan view of a fragmentary portion of a program belt with legends added as an aid to explanation.

Continuing now the description of the program assembly, the punched program belts 136 and 136' are each in the form of a continuous loop of any desired length. They are of sufficient length to accommodate the required programming thereon, and are not limited to any particular length. Circular holes 192 (see also FIGURE 17) are formed along opposite edges of the belt, which holes are engaged by radially extending cylindrical drive pins 194 at opposite ends of the rolls for drive actuation of the belt upon rotation of the drive rolls. Spaced vertical wall members 196A, 196B and 196C are attached to the base plate 144 by any suitable means, not shown, for vertical support of the belts 136 and 136' between adjacent walls. In the illustrated arrangement the belts are shown of a length to terminate between the walls. It will be apparent, however, that where larger belts are required they may extend beyond the ends of the walls. The belts are maintained in engagement with the drums by plates 198 (see FIGURES 8 and 10) having concave arcuate faces closely spaced from the drums in the operating condition of the device. The plates 198 are located at opposite ends of the drive drums adjacent the pins 194 to maintain the belts on the drums.

The program belts 136 and 136' are formed of a tough, flexible insulating material. Additionally, the belt material must possess a high degree of dimensional stability in order that dimensions thereof will not change with temperature and the like, for otherwise locations of belt apertures with respect belt drums would vary, so as to disrupt operation. One highly desirable belt material is a saturated polyester plastic film of poly (ethylene terephthalete) available under the trademark "Mylar." Mylar film belts are non-conducting, very tough, and possess the required dimensional stability with environmental changes in temperature, humidity, etc. The desired programs are entered on the belts by punching holes 200 therethrough in predetermined locations so that brushes carried on the reading or sensing heads 134 and 134' engage the drum itself at these locations. For purposes of description, the belts may be considered as divided into vertical columns, any number of which columns may be included on the belts since, as mentioned above, the belts may be made of any desired length. The belt also has 111 horizontal positions or channels. The hole positions for each vertical column are arranged in-line, and in FIGURE 17 the hole positions for an entire column are shown and their functions are labelled. In practice, of course, not all of the positions for any one column are punched. Information for a complete program (or alternate program) is contained between the vertical lines 204.

The sensing heads 134 and 134' are pivotally mounted on posts 206 attached to and extending upwardly from the base plate 144. The heads are movable between the operative sensing position illustrated in the drawings to a spaced position from the drive roll and program belt. In the withdrawn position of the head the program belts may be easily released from the drive pins 194, lifted vertically from the drive rolls, and replaced with another program belt.

The sensing heads 134 and 134' each comprise a rigid, generally rectangular shaped frame 208 with a rectangular-shaped aperture 210 therethrough, as seen in FIGURE 9. Forwardly extending apertured legs 212 are formed at one side of the frames for pivotal support of the frames on the posts 206.

Pivotal actuation of the frames 208 of the sensing heads about the posts 206 is manually controlled by means of a handle 214 at each of the sensing heads (see FIGURE 8). As seen in FIGURES 8 and 9, each handle is secured to the upper end of a shaft 216 pivotally mounted on the base plate 144. A lever arm 218 is atached to the shaft and connected to one arm of a lever 220 through a connecting link 222. The lever 220 is pivotally mounted intermediate its ends on a pin 224, and the other arm of the lever is provided with an elongated slot which engages a pin 226, carried by the frame 208. As mentioned above, the sensing heads 130 and 130' are shown in a closed position, that is, in reading position adjacent the program belts. A resiliently biased detent arrangement 227 releasably latches the head in closed position. In order to open a head the associated handle 214 is rotated counterclockwise, as viewed in FIGURE 8, whereupon the sensing head is pivoted about the post 206. The plates 198 carried on the frame 208 are thereby moved away from the drive roll whereby the program belt may be removed from the apparatus by disengaging the same from the drive pins 194 and then lifting it vertically off the drive roll.

The present invention provides an improvement in programming control mechanism of the type generally described above in that the drive drums or rolls 130 and 132 are longitudinally segmented by annular insulating dividers and different electrical potentials are applied to these separated segments. Electrical signals for programming are obtained by spring-loaded brush-type contacts riding upon the exterior surface of a belt that passes about the drum, so that these brushes move into holes in the belt to make electrical contact with the drum segment therebeneath and to, consequently, receiving the potential thereof as a pulse signal for control and operating purposes. The contact brushes are so formed as to readily ride upon the belt surface and to move easily in and out of the belt apertures or holes without the necessity of retracting means.

The two drive drums, or rolls 132 and 132' may be of like construction. As seen in FIGURE 11, each comprises a pair of hubs 228 of insulating material attached by pins or the like to the rotatable shaft 138. A sleeve 230 of insulating material extends between the hubs and is secured thereto as by cementing or other suitable means, not shown. A plurality of drum contact rings 232A, 232B, 232C and 232D are carried by the sleeve and end hubs, with adjacent rings spaced apart by thin rings 234 of insulating material to electrically isolate the separate drum segments defined by these rings. Brushes 236A to 236D ride the rings 232A to 232D, respectively, for application of desired different potentials to separate rings or segments. The brushes are mounted on insulating blocks 238 which, in turn, are attached to guide plates 240 by any suitable means, not shown. Screws 242 secure the guide plates 240 to the escapement plate 174. The guide plates 240 are formed with a pair of diverging walls between which walls the brushes are mounted. The guide plates 240 function to guide the belts 136 and 136' onto and off the drive drums.

The conducting rings 232A to 232D of the drive drums are also adapted to be contacted by brushes 244 through the holes 200 punched in the program belts 136 and 136'. In the illustrated arrangement at total of one hundred eleven (111) brushes 244 are provided, of which the upper fifty-eight (58) brushes are adapted to engage the upper ring 232A, the next forty-four (44) brushes are adapted to engage the ring 232B, the next three (3) brushes are adapted to engage the ring 232C, and the lower six (6) brushes are adapted to engage the lower ring 232D.

The brushes 244 are mounted in spaced relation along boards 246 of insulating material by any suitable means, not shown. There are a total of four such boards 246 with twenty-eight brushes on each board. The brush carrying boards 246 are of the same interchangeable construction. Two boards are mounted in spaced relation on each upright leg portion of the rectangular shaped frame 208. Each board is provided with amounting block 248 (see FIGURE 10) secured thereto by any suitable means, not shown. A fastening bolt 250 extends through a horizontally elongated holes 252 in the frame and threadedly engages a tapped hole in the block 248. Also, a bracket 254 is attached by screws to the side of the mounting blocks 248, and an arm of the bracket extends adjacent the frame 208. A screw 256 having neck of reduced diameter slidably engages the bracket 254 in a vertical slot therein and is threaded into a tapped hole in the frame 208 to secure the bracket to the frame at adjustable positions thereon. With horizontal adjustment attained by the screw 258, the block is locked by tightening the fastening bolt 250.

Figure 10:
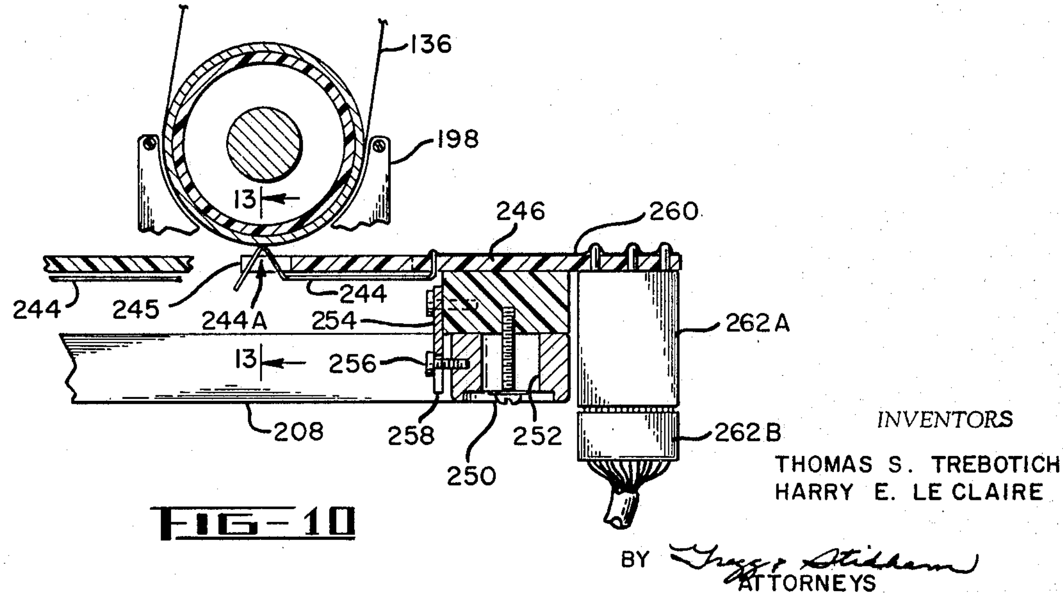
FIGURE 10 is a fragmentary horizontal sectional view taken along the line 10—10 of FIGURE 9.
Figure 13:
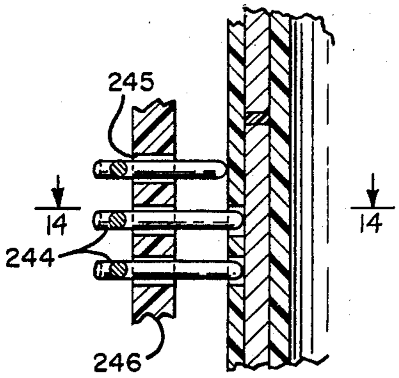
FIGURE 13 is an enlarged fragmentary sectional view taken on line 13—13 of FIGURE 10 showing sliding contacts riding the program belt and entered into holes in the belt.
Figure 14:
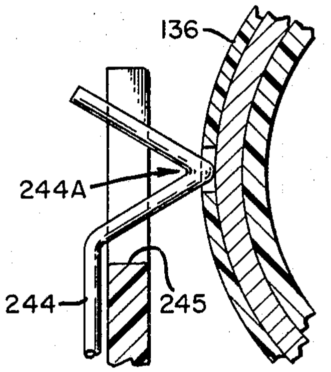
FIGURE 14 is a sectional view taken on line 14—14 of FIGURE 13.

As best seen in FIGURES 10 and 14, each brush, or contact arm 244 is formed with a V-shaped outer end portion 244A which is biased by the resiliency of the arm itself into contact with the program belt 136. The V-shaped portions of the brushes extend through slots 245 in the mounting boards 246 for guiding the brushes. As long as the brush rides on the belt 136 no electrical connection is made between the brush and associated drum ring or segment 232A to 232D. When the V-shaped portion of the brush registers with a punch or perforation in the program belt (as shown in FIGURES 13 and 14) the brush contacts the cylindrical conducting member, or ring, of the drive drum for completion of the electrical circuit therebetween. Lead wires 260 (FIGURE 10) connect the brushes 244 to a socket portion 262A of a connector, and cables from the connector plug 262B connect to circuits described hereinbelow. It will be apparent that the brushes 244 remain in operative position for contact with the program drum through the apertures in the program belt at all times that the sensing head is in the closed condition illustrated in the drawings. When the sensing heads are opened by rotation of the handles 214, in the manner described above, the brushes 244 are withdrawn from the drums and program belts thereby permitting removal of the belts from the drums. With the sensing heads in a closed position the brushes 244 contact the belt along a vertical straight line for sensing perforations in vertical columns of the belt.

In operation of the device the rotation of the drive drum is stopped by the escapement mechanism at a position wherein the brushes are in sensing position with a vertical column of the belt for sensing performations therein.

When the program belt 136 stops, one of the line position contacts 244–59 through 244–106 engages the second ring segment 132D of the drive drum through a perforation in the belt. As diagrammatically shown in FIGURE 19 the drug 132B is connected to a ground terminal 46 whereby the contact 244 which engages the ring segment is grounded.

The servo system for the carriage drive motor 104 includes the voltage divider 124 which comprises the servo-connected resistors 122 (see FIGURES 15, 16 and 19). One end of the voltage divider is shown connected to a first, or positive, D-C potential source, and the other end of the voltage divider is shown connected to a second, or negative, D-C potential source. Taps 268 are provided between interconnected resistors of the voltage divider to which the brushes 244–59 through 244–102 are connected. The taps 268 therefore are selectivel connected to a third D-C potential (i.e. ground potential) intermediate the first and second potentials at the opposite ends of the voltage divider. The taps 268 are also connected to the individual contacts C-1 through C-33 of the commutator 114 along which the slide, or brush, 120 travels. It will be apparent that the potential at the movable brush 120 will depend upon the position of the brush along the fixed contacts C–1, etc., and upon which tap 268 is connected to ground through a closed belt-controlled contact 244–59 etc. The difference in potential between the tap 268 connected to ground through a closed contact 244–59 etc., and the tap connected to the movable contact 120 is hereinafter termed an error voltage, or signal. It will be apparent that the polarity of the error voltage depends upon which direction the movable contact 120 is displaced from the grounded contact 144–59 etc.

As described above, and shown in FIGURE 4, the brush or contact 120 is mounted on the light bar carriage which is movable by the motor 94. The error signal at the contact 120 is applied through a conductor 500 to a bipolar amplifier 502 shown in FIGURE 19 for control of the energization and direction of rotation of the motor 94. The motor is energized to drive the brush 120 to a position of zero error voltage.

Any suitable type reversible motor 949 may be used for driving the carriage, and for purposes of illustration, a reversible shaded pole motor 94 is shown. The motor comprises a main field winding 504 and two set of shading coils, one of which sets includes shading coils 506, 506 and the other of which sets includes shading coils 508, 508. The main field winding 504 is adapted for connection to a conventional 115 volt A-C source 510 through a pair of silicone controlled rectifiers 512. Normally open relay contacts 514A or relay 514 are included in the control circuit for the control electrodes 516 of the silicone controlled rectifiers, which control circuit is of conventional design. It will be sufficient to note that the one silicone controlled rectifier is turned on during alternate half cycles of the source 510 and the other silicone controlled rectifier is turned on during the opposite alternate half cycles when the relay contacts 514A are closed for energization of the field winding 504. The direction of rotation of the motor 94 will depend upon which pair of shading coils 506 and 506 or 508 and 508 is made operative. The pairs of shading coils are selectively short-circuited through relay contacts 518A of a relay 518. When the field winding 504 is energized the motor 94 is rotated in one direction in the illustrated position of the contacts 418A and in the opposite direction when the relay contacts 518A are switched to the other position.

The control windings of the relays 514 and 518 are in shunt with switching transistors 520 and 522, respectively, which transistors are in a normally conducting condition to provide normally conducting shunt paths with the relay windings whereby the windings are in a normally deenergized condition. With the application of a positive signal to the input conductor 500 of the amplifier 502, the transistor 520 is cut off and the transistor 522 remains in the conducting state whereby the relay 514 is energized and the relay 518 remains deenergized. The motor 94 is thereby energized for rotation in one direction. With the application of a negative signal to the input conductor 500 of the amplifier the transistor 520 is again cut off and the transistor 522 is now also cut off whereupon both relays 514 and 518 are energized. The motor 94 is thereby energized for rotation in the opposite direction.

Figure 20:
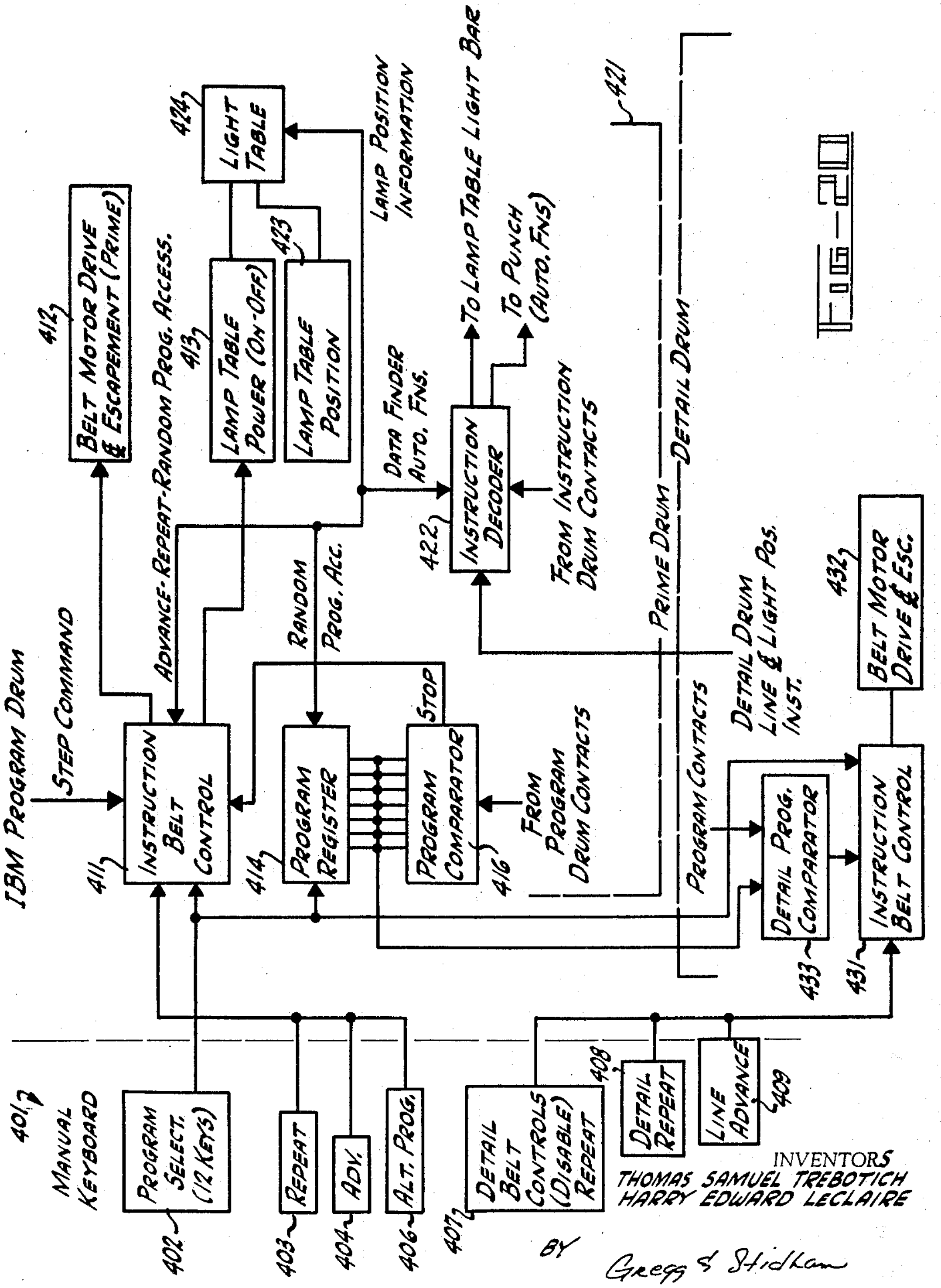
FIGURES 20 to 23 are schematic function diagrams of control and actuation of the present invention.

Considering now the electrical portion of the present invention insofar as an accomplishment of functions generally referenced above and control and operation of mechanism previously described, reference is made to FIGURE 20 setting forth a functional electronic diagram. At the left of the figure, there is illustrated the manual keyboard 401. There is provided on this keyboard twelve program-select buttons or keys, as indicated at 402 for the manual selection by an operator of any one of these twelve primary programs, in connection with the primary programs there are also provided the key 403 for repeating the last program run, 404 for advancing to the next primary program and 406 for selecting the next alternate primary program. It is again noted at this point that the primary belt is pre-punched to provide twelve primary programs thereon, and each of these primary programs may be followed in sequence on the belt by one or more alternatives to such programs, wherein certain portions of the primary program may be deleted or other portions added, but which, generally follow the primary program itself. The manual keyboard also includes certain keys or buttons relative to the retail belt. However, it is believed most undestandable to first describe prime belt operation as set forth below.

Each of the keys or buttons on the manual keyboard operate to connect a power supply to elements of electronic circuitry as described, so that it may be considered that upon actuation of a program-select key, for example, there is applied a signal therethrough for actuation of the function and circuit connected thereto. The program select keys 402 are shown in FIGURE 20 to be connected to an instruction belt control 411 and likewise the repeat; advance and alternate program keys of the keyboard are connected as inputs to this instruction belt control. An additional input to the instruction belt control 411 is provided from the program drum of the associated apparatus, such as, for example, an IBM key punch device to provide step commands thereto. This instruction belt control 441 operates to actuate and control the belt motor drive and escapement of the prime belt as indicated by the box 412, and, also, to turn on and off the lamp table power, as indicated at 413. In actuality, the signal applied from the manual keyboard to the instruction belt control operates only to activate the latter, and insofar as the extent of belt movement for choice of a particular program, the signals from the primary belt portion of the manual keyboard are also applied to a program register 414 which operates to register the particular signals of a chosen program. A program comparator 416 receives the program signals from the program register and also receives program signals from the drum contacts as the prime belt moves over the drum. Upon a coincidence in the program comparator of the signals stored in the program register and the signals received from the drum contacts, there is produced by the program comparator a stop signal which is applied to the instruction belt control 11 for terminating belt drive. This, then, functionally provides for accomplishment of particular program selections, the repeating of a program, the advancement to the next program, or the choice of an alternate program at the control of the operator from the manual keyboard.

In addition to the foregoing functions the present invention also provides for certain automatic functions which are accomplished at the control of the drum contacts actuated by particular primary belt perforations. There is schematically illustrated as 421 the primary drum and it will be seen that from the drum contacts, signals are applied to an instruction decoder 422 which produces output signals for automatic operation of the data finder and punch machine. As shown in FIGURE 20 the instruction decoder 422 has an output connected to an input of the instruction belt control 411 to provide advance, repeat, and random program access signals thereto. The instruction decoder also applied a signal to a lamp table position control 423 and provides lamp position information to the light table itself 424. In addition, the decoder 422 provides a control signal to the punch actuator of the punch machine as indicated.

Not only is the instruction decoder 422 operated from the primary drum contacts in conjunction with the primary belt, but, also, it receives signals from the drum contacts engaging the detail drum, as shown in FIGURE 20.

The above described functional layout of the control and actuation portion of the present invention insofar as electronics are concerned relates primarily to primary belt operation; however, the detail belt is also controlled in part from the manual keyboard.

It will be seen that upon the manual keyboard there are also provided certain keys or pushbuttons relating to detail belt controls and including a disable key 407, a detail repeat key 408 and a line advance key 409. Each of these keys are connected to a detail instruction belt control 431 which produces an output operating and controlling a belt motor drive and escapement operation 432 for the detail belt. Inasmuch as detail belt operation is in part controlled by the prime program selected, the program register 414 noted above has the output thereof connected to a detail program comparator 433 which also receives an input from the program register and program contacts on the detail drum. The detail instruction belt control 431 receives inputs from the detail program comparator in the form of a stop signal much in the manner of the primary belt as described above, and, also the detail instruction belt control 431 receives an input from the prime program keys of the keyboard.

Figure 21:
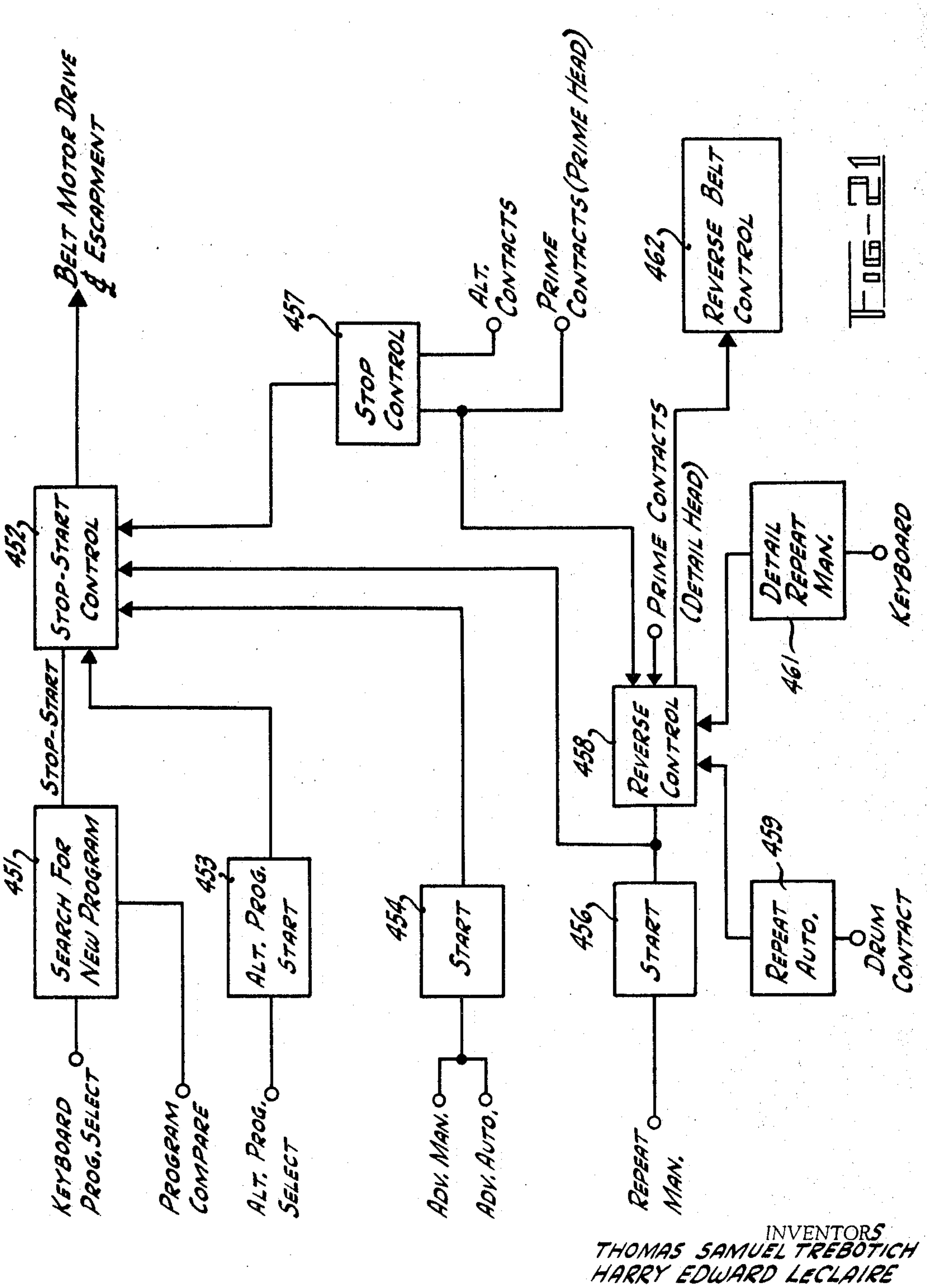

There has been briefly set forth above a functional description of electronic control and operation of the present invention which generally establishes the manner in which same is accomplished. Individual functions described in connection with FIGURE 20 above are worthy of somewhat further consideration herein as set forth below in connection with FIGURES 21, 22 and 23. Certain of the functional blocks illustrated in connection with FIGURE 20 incorporate a substantial number of individual functions and operations, so that it is believed preferable for full understanding of the present invention to individually describe same. In particular, reference is made to the instruction belt control 411 which is illustrated in somewhat greater detail in FIGURE 21. Referring now to this drawing it will be seen that the keyboard keys relating to the prime program are connected to a search for new program 451 as are the program comparator signals. Coincidence of the two input signals in the search for new program produces an output signal applied to a stop-start control 452 that in turn operates the escapement. This stop-start control is also energized from alternate program key 406 through an alternate program start 453, from both advance manual and advance auto through a start function 454 and from a repeat manual key through a start function 456. In addition, the stop-start control 452 receives an input from a stop control 457 that is actuated by alternate prime program contacts of the primary drum, and prime program contacts from the primary drum. The prime contacts are also connected to a reverse control 458 which, likewise, receives a signal from the start 456 and from the detail drum contacts. This reverse control is additionally the receipient of the output of an automatic repeat 459 operated from drum contacts and a signal from manual detail repeat 461 operated from the manual keyboard. The reverse control 458 produces an output signal operating a reverse belt control 462. The circuit briefly described above primarily with regard to functions will be seen to operate in response to a keyboard program select key operation, for example, in order to provide a start signal for the primary belt and to provide a stop signal upon an identity being reached between the chosen primary program and the actual belt program read from the belt itself. This instruction belt control, furthermore, operates to move the belt to a chosen alternate primary program, as well as to advance from one primary program to another, either manually or automatically. Under the circumstance wherein a primary program is to be repeated, the primary belt is reversed in movement, so as to more rapidly reach the desired program without the necessity of traversing the entire belt length.

Figure 22:
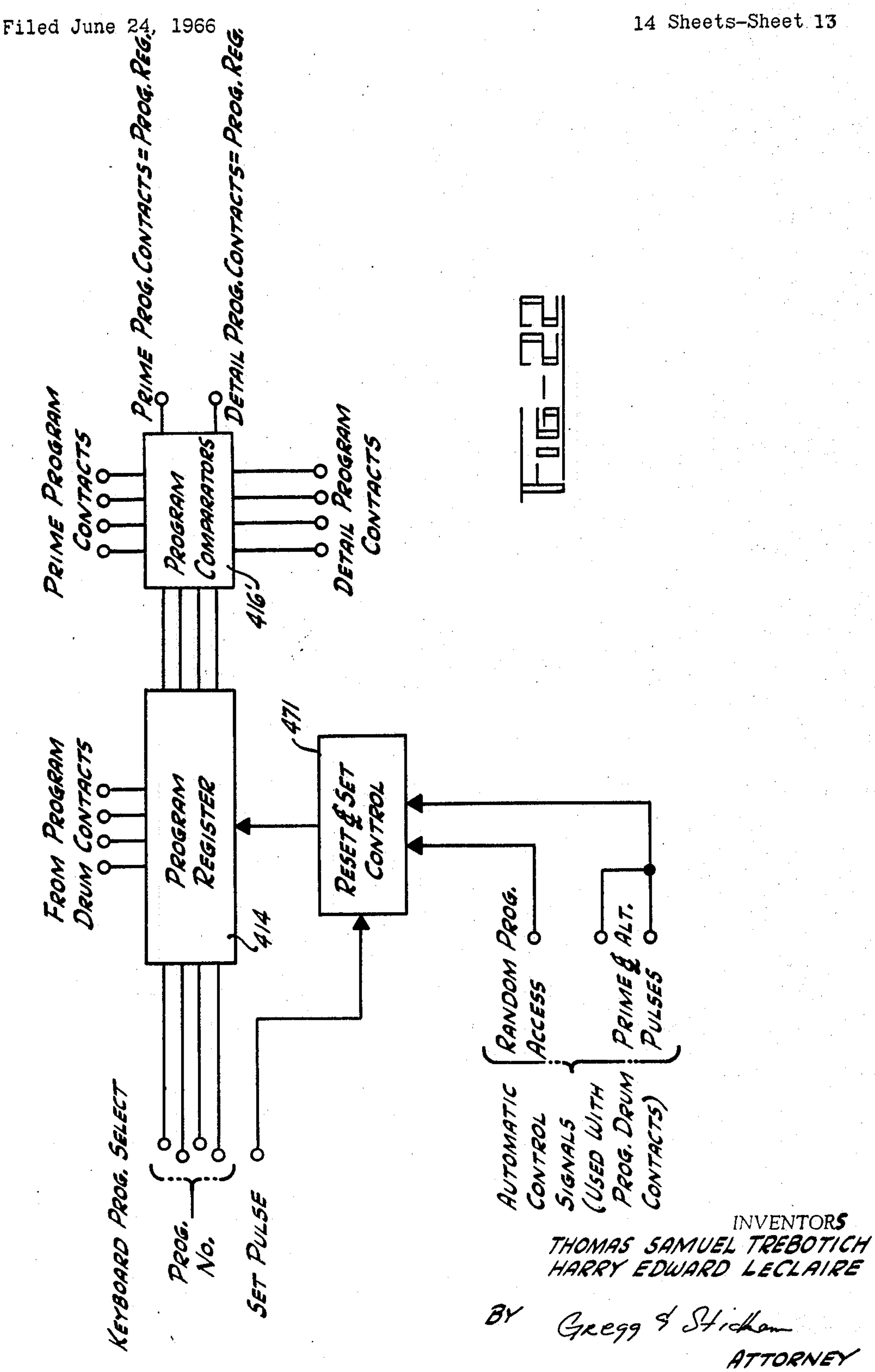
Figure 23:
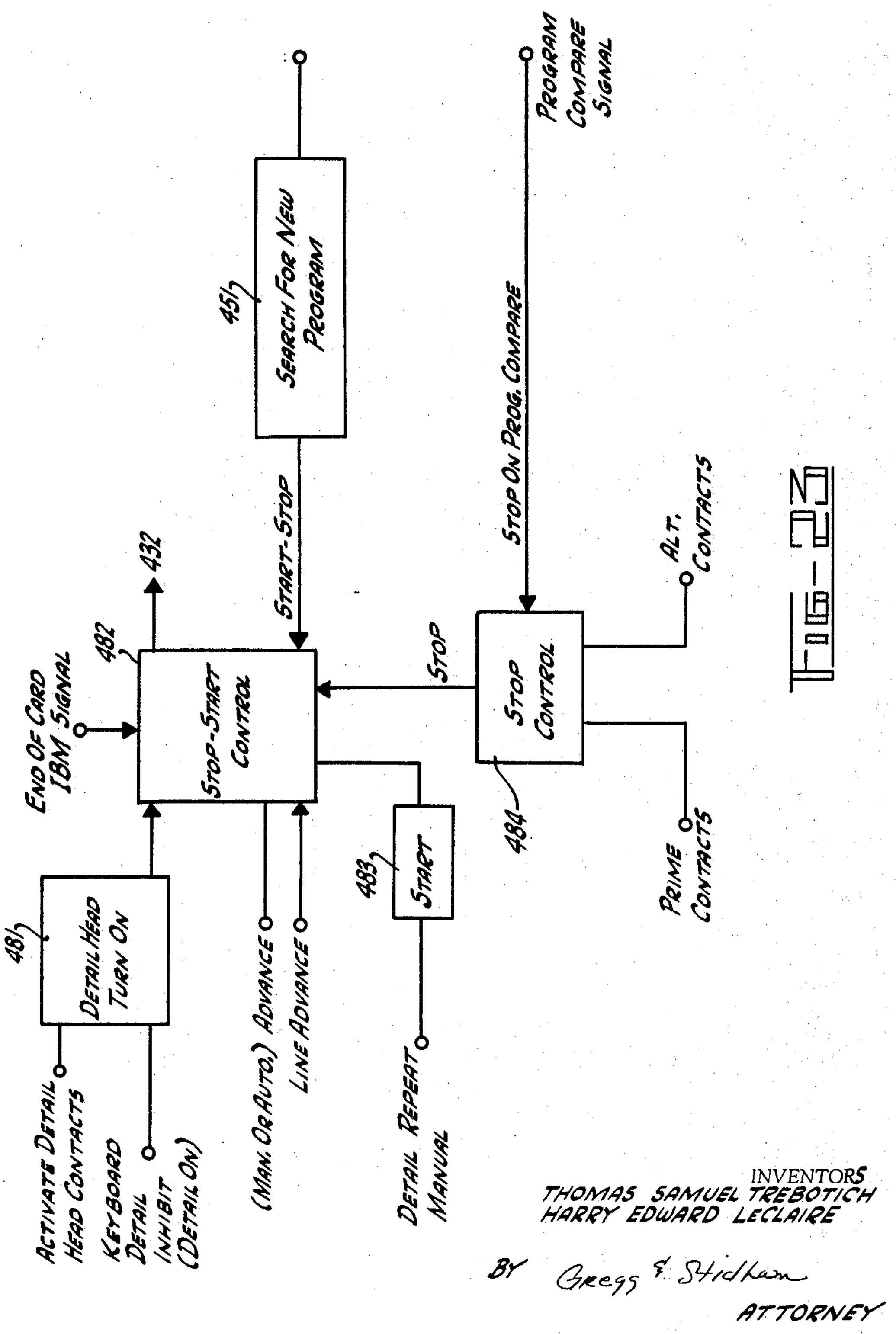

With regard to the program register and comparator illustrated at 414 and 416 of FIGURE 20, reference is made to FIGURE 22 wherein there is illustrated the program register 414 having four inputs from the key punch program drum contacts. This program register also has four inputs from the primary program select keys on the manual keyboard. It is noted in this respect that the primary programs are identified by binary coding, so that only four lines are required for a choice of twelve possible primary programs provided on each individual belt.

The program register 414 of FIGURE 22 is illustrated to be connected to the program comparators which in FIGURE 20 are separately indicated at 416 and 433. In actuality it is most convenient to combine the detail program comparator and the primary program comparator into a single unit, as illustrated in FIGURE 22. This program comparator herein denominated by the numeral 416′ will be seen to also obtain four outputs from the primary drum program drum contacts operating from the primary belt, and four inputs from contacts reading the detail belt. Within the program comparator 416′ there is, thus, produced a comparison as the primary and secondary belts are read until an identity is reached. An identity of prime programs produces an output at terminal H and an identity with regard to detail programs produces an output at terminal K that are, in turn, stop signals for the instruction belt controls of FIGURE 20. As also illustrated in FIGURE 22 there is provided a second reset control 471 receiving a "set pulse" input from the manual keyboard, and, also, receiving automatic input signals from the belts in the form of a random program access signal and also primary and alternate pulse signals.

With regard to the detail instruction belt control 431 of FIGURE 20, it is noted that the functions thereof differ somewhat from the primary instruction belt control 411 described above; and, thus, reference is made to FIGURE 23 for a general description of the detail instruction belt control. As shown in this figure, there is provided a detail head turn-on or start 481 operated by signals from an activate detail contact, and a detail inhibit contact or button upon the manual keyboard. As a central portion of this figure there will be seen to be provided a stop-start control 482 receiving a plurality of input signals relating to stopping and starting of the detail belt, and, consequently, producing an output signal to the belt motor drive and escapement 432. An end-of-card signal is applied from the keypunch machine itself to this stop-start control at 482, and, likewise, inputs are provided from the manual or automatic advance and line advance, as well as from the manual detail repeat, in this instance through a start unit 483. The search for new program numbered 451 in FIGURE 21 also provides an input signal to the stop-start control 482 and, in addition, a stop signal is provided from a stop control 484 that is, in turn, operated from the primary and alternate signals and from the program comparison signal as produced in FIGURE 22.

There has been briefly described above functional control and operation of the overall apparatus of the present invention. It is to be appreciated that a relatively wide variety of different operations may be performed at the choice of the designer, and the particular preferred embodiment of the invention described incorporates a substantial number of manual and automatic operations which are actually subsidiary to the invention itself and are only herein generaly described for the purpose of roughly illustrating capabilities of the invention. It is not intended by the description of the apparatus functions to in any way limit the invention hereof, nor to indicate that any particular utilization of the novel programming of the present invention is limited thereto. It is clearly well within the skill of those knowledgeable in the art to devise particular logic circuits employing conventional components for carrying out the functions exemplified by the foregoing description and generally illustrated in FIGURES 20 to 23. Again it is emphasized that the functional details as well as the actual electronic circuitry does not form any primary portion of the present invention and may be modified, varied and extended at will to tailor the present invention to particular applications. It is for this foregoing reason that only a relatively brief and general description of the electronics of the present invention is included herein. It will be readily recognized that a knowledgeable electronic engineer can readily proceed from the general description herein to the actual detail design of operable equipment in accordance with the present invention, and, of course, the complexity of resultant circuitry is largely dependent upon the extent and number of desired functions, both as to manual and automatic control.

It is important to note in a complete understanding of the present invention that the method and apparatus for programming, i.e., producing electrical signals that may then be employed in any desired circuitry for actuation and control of data identification and recording provides a material improvement over prior art. The manner in which individual signals are employed is not limiting upon the scope of the present invention, but the development of these signals is important. More specifically, the present invention provides for the production of control signals from a flexible, insulating endless belt having perforations of predetermined location therethrough and, in part, riding over the segmented drum. Electrical signals are produced in accordance with the present invention by resilient electrical contacts riding upon the aforementioned belt in a linear array across the width thereof as the belt is moved over the drum, so that upon registration of a contact with a belt perforation, the contact then engages one of the drum segments to complete an electrical circuit for establishing a control pulse. Furthermore, in accordance with the present invention, the drum itself is segmented into four separate electrically insulated portions which may have different electric potentials applied thereto. The electrical signal or pulse produced by contacts engaging the drum through belt perforations is herein employed to energize particular lights on the light table so as to underline certain information possible contained on a data sheet of some sort located upon such table. This, then, provides an operator with a visual indication of the particular data to be transferred or recorded from the data sheet and, as the belt moves, the perforations in predetermined orientation thereon cause electrical signals in desired sequence to consequently underline successive data portions on the data sheet at the light table, so the operator automatically records or employs the data in the proper sequence. This is particularly useful in key punch operations and, consequently, the present invention has been described in connection with a key punch machine; however, it is to be appreciated that the invention is in no wise limited to this one application. It is noted by way of example only that programming of the present invention is advantageous in slow speed data logging and control, and sequential industrial control such as blending, sorting, batching, etc.

It is to be further noted that the present invention provides a highly advantageous scanning of the light table by a light bar, so as to simplify the identification of the particular data to be underlined at such successive instance. The combination of the particular programming method and apparatus of the present invention with the advantageous scanning hereof produces a marked improvement in the field.

In addition to the above-described operation of the present invention, it is possible in accordance herewith to incorporate a high degree of program flexibility which further simplifies the identification of data for recording or the like. Thus, a plurality of automatic operations may be accomplished again by utilization of particular drum contacts in conjunction with belt perforations. In many instances it is required that certain data from the data sheet or the like be repeated upon a plurality of punch cards, for example, but, that certain separate data be individually applied to successive cards. This may be accomplished herein by the utilization of certain automatic functions wherein a prime program repeats for each card, but alternative programs are employed for successive cards. This is even extended to the point of automatically operating a key punch machine, for example, to repeat punching of the repetitious data on successive cards, thereby freeing the operator from the task of repeatedly recording the same data. By the employment herein of both primary and detail belts, capabilities of the invention are extended and the available possible programming variation is multiplied.

Although the present invention has been herein described with reference to a particular embodiment thereof, it is not intended to limit the invention to the exact details of the foregoing description or accompanying drawings. Reference is made to the appended claims for a precise definition of the true scope of the invention.

We claim:

1. Data indicating apparatus comprising a transparent table adapted to hold a document from which data is to be identified in predetermined sequence, a plurality of light bars movable together beneath said table to scan a document thereon, each of said light bars having a plurality of separated lights therein with slits for emitting light upwardly from individually energized lights, an endless flexible belt of electrically insulating material having perforations therethrough in predetermined locations, a rotatable drum engaging said belt for moving same over the drum, said drum being electrically segmented and energized with different electrical potentials on separate segments, a read head disposed adjacent said drum and having a plurality of resilient electrical contacts extending therefrom, each of said contacts being disposed to bear upon the belt on said drum and to ride thereon with a sharply curved portion engaging the belt to thereby ride into and out of belt perforations to selectively engage the underlying drum segment, control circuitry interconnecting the contacts of said read head and means moving said light bars as well as individual lights in the light bars to thus produce lines of light through a document in predetermined sequence in accordance with the location of belt perforations, and means interconnecting selected read head contacts with drum drive means for selectively rotating the drum to predetermined belt locations.

2. The apparatus of claim 1 further defined by control means operatively connected to predetermined read head contacts and to a manual keyboard for producing a control signal upon an identity of read head signals and manual keyboard signals for moving the belt to a particular location dictated by the manual keyboard.

3. Data indicating apparatus as set forth in claim 1 further comprising a multi-tap voltage divider having a source of direct current voltage connected thereacross, a slide electrically contacting said voltage divider for movement therealong and mounted to said light bars for movement therewith, means for applying to different individual taps of the voltage divider a direct current voltage intermediate the voltage of said source in response to signals from said read heads, and means employing the voltage difference between the slide and energized divider tap to move said light bars to reduce said voltage difference to zero.

References Cited

UNITED STATES PATENTS

| | | | |
|---|---|---|---|
| 969,646 | 9/1910 | Meredith | 340—339 |
| 1,623,164 | 4/1927 | Carroll | 235—61.11 |
| 2,672,287 | 3/1954 | Reitfort | 235—61.7 |
| 3,303,331 | 2/1967 | Biegel et al. | 235—61.11 |
| 3,345,500 | 10/1967 | Russell | 235—61.11 |

OTHER REFERENCES

Hauslein, Multiple Sensing of Punched Cards, IBM Technical Disclosure Bulletin, March 1952, vol. 4, No. 10, p. 16.

MAYNARD R. WILBUR, Primary Examiner

T. J. SLOYAN, Assistant Examiner

U.S. Cl. X.R.

235—61.11